United States Patent [19]

Henrion

[11] 3,758,761

[45] Sept. 11, 1973

[54] SELF-INTERCONNECTING/SELF-REPAIRABLE ELECTRONIC SYSTEMS ON A SLICE

[75] Inventor: W. S. Henrion, Houston, Tex.

[73] Assignee: Texas Instruments Incorporated, Dallas, Tex.

[22] Filed: Aug. 17, 1971

[21] Appl. No.: 172,462

[52] U.S. Cl. ...... 235/153 AK, 324/73 R, 340/172.5

[51] Int. Cl. ........ G06f 11/00

[58] Field of Search ........ 235/153 AK; 324/73 R; 340/174 ED, 174 TC, 172.5; 307/204, 213, 219

[56] References Cited

UNITED STATES PATENTS

| | | | |
|---|---|---|---|
| 3,665,174 | 5/1972 | Bouricius et al. | 307/219 |
| 3,631,229 | 12/1971 | Bens et al. | 324/73 R |
| 3,543,232 | 2/1972 | Kilby | 307/213 |
| 3,649,910 | 3/1972 | Vinsano et al. | 324/73 R |

*Primary Examiner*—Charles E. Atkinson
*Attorney*—Harold Levine et al.

[57] ABSTRACT

A complex electronic system such as a memory, or a stored program computer has a plurality of subsystems with predetermined interconnections on a semiconductor substrate. Subsystem selection circuits in combination with subsystem enable circuits are interposed between one or more of the subsystems or a portion thereof and one or more common bussing systems. In one embodiment the subsystems which meet desired performance specifications are automatically selected by the selection circuits and enabled to interconnect the subsystems in a desired system configuration, and the subsystems not meeting the desired performance specifications or meeting such specifications but not necessary for the desired final system configuration are left isolated from the completed system. The system may be permanently packaged or sealed. In the event that enabled subsystems thereafter malfunction, the selector circuits are operated externally of the package to automatically disable the malfunctioning subsystems and enable substitute subsystems which meet the desired performance specifications but which were not originally necessary for completion of the system.

37 Claims, 32 Drawing Figures

INVENTOR W. S. Henrion
BY Stephen S. Sadacca
ATTORNEY

SELF-INTERCONNECTING/SELF-REPAIRABLE ELECTRONIC SYSTEMS ON A SLICE

This invention relates to complex electronic systems and, more particularly, to self-interconnecting/self-repairable complex electronic systems integrated on a single slice of semiconductor material, and the methods of fabricating, interconnecting and repairing such systems.

In the fabrication of complex electronic systems, each subsystem is usually tested before it is connected into the system. In many instances, however, it is more desirable to fabricate the entire system at once prior to testing. Consider, for example, a complex electronic system integrated on a single slice of semiconductor material; certain manufacturing and reliability advantages are achieved by forming all of the circuits on the slice or substrate at the same time. In the fabrication of large scale integrated circuits (LSI), one fabrication technique is to fix wire all connections of the circuits on the semiconductor substrate and then test the entire unit. If one element does not operate satisfactorily, the entire unit may be rejected. Consequently, yields are limited according to the fix wire approach and decrease with increasing circuit complexity. A more flexible approach is that of discretionary wiring by which the components and circuits may all be formed at the same time and may also be tested individually. In discretionary wiring, a unique connection pattern is generated for connecting only the satisfactory circuits into a desired system configuration after the circuits have been tested. That is, a separate unique metallization mask is required to be generated for each substrate processed by the discretionary wiring technique, even though the resulting "black box" LSI systems produced are electrically or functionally the same.

In copending Patent Application Ser. No. 110,216, filed Jan. 27, 1971, by Harvey G. Cragon, for COMPLEX ELECTRONIC SYSTEMS ON A SLICE, highly complex semiconductor electronic systems, which one might consider in the realm of advanced large scale integration (ALSI), are achieved with substantially 100 percent yields and without the requirement and expense of specialized connecting patterns or unique metallization masks for each slice processed. Patent Application Ser. No. 110,216, assigned to the assignee of the present invention, is hereby incorporated by reference. According to an embodiment of such patent application, complex electronic systems having sets of subsystems, including superfluous subsystems, are essentially permanently interconnected before testing. The interconnections include common electrically conductive bussing systems to which the subsystems are selectively coupled. Thee means coupling the various subsystems to the common bussing systems include enable circuits which selectively isolate each of the subsystems from each other and from the common bussing systems. Several methods of testing the subsystems are described in such patent application and also in copending Patent Application Ser. No. 142,959 filed May 13, 1971, by W. S. Henrion for METHOD OF TESTING AND INTERCONNECTING SUBSYSTEMS FOR COMPLEX ELECTRONIC SYSTEMS ON A SLICE. Patent Application Ser. No. 142,959, also assigned to the assignee of the present invention, is hereby incorporated by reference. Whatever method of testing and interconnecting is utilized, the final desired system is achieved in which the enable circuits associated with those subsystems which meet desired performance specifications and are necessary for completion of the desired final system are in an enabled condition so that such associated subsystems are selectively coupled to the common bussing system and those subsystems which do not meet the desired performance specifications or which meet the desired performance specifications but are not necessary for the completion of the desired final system remain isolated from the common bussing system According to the present invention, subsystem selection circuits, in combination with subsystem enable circuits, are integrated on the slice along with the subsystems to provide a system which is self-repairable and/or in which the subsystems are self-interconnecting. In the self-interconnection mode, the subsystem selection circuits automatically select enough subsystems to complete the final system regardless of whether the subsystems meet the required performance specifications and regardless of whether the system has already been packaged and sealed. In the event that one or more of the automatically selected subsystems do not meet the required performance characteristics when tested, the associated selection circuits are operated to disable the malfunctioning subsystems and automatically select replacement subsystems. In the event that one or more of the replacement subsystems do not meet the required performance specification, the selection circuits of those malfunctioning subsystems are operated to disable them from the system and the selection circuits automatically select further replacements.

Once the final system is achieved, whether in the manner described in copending Patent Applications Ser. Nos. 110,216 or 142959 or in the self-interconnection mode above described, the selection circuit may be utilized in a self-repair mode. In the self-repair mode, the system is capable of repair after it has been permanently packaged or sealed by operating the selection circuit associated with a malfunctioning subsystem to disable such malfunctioning subsystem from the common bussing systems and thereby isolate it from the system. The selection circuits then automatically select and enable a replacement subsystem in the same manner as the self-interconnecting mode described above.

It is therefore an object of the invention to provide electronic systems which are self-interconnecting and/or self-repairable.

It is also an object of the invention to provide highly complex advanced large scale integrated systems on a semiconductor slice which are self-interconnecting and/or self-repairable and means and techniques for fabricating and repairing the same.

These and other objects and adavnatages are accomplished in accordance with the present invention by providing automatic subsystem selection circuits in combination with enable circuits for a plurality of subsystems including superfluous subsystems and common bussing systems to which the subsystems are selectively coupled by means of the enable circuits in accordance with the respective states of the automatic selection circuits. In a preferred embodiment, the selection circuits, as well as the enable circuits, are fabricated on a semiconductor substrate or slice, along with the subsystems and common bussing systems. All circuits, subsystems, bussing systems and interconnections may be fabricated and the substrate packaged regardless of the operability or performance status of the subsystems, as the selection circuits provide almost limitless flexibility in selecting subsystems and selectively coupling subsystems into the system or isolating subsystems from the system. In one embodiment, the selection circuits each include fuses such as those comprised of fusable metal, fusable semiconductor material, semiconductor junctions which are capable of being blown to create an open circuit at the junction, or the like, coupling the subsystems and the enable circuits to bias buss lines or terminals. A signal is applied to an input/output line which is coupled to a malfunctioning subsystem to select such malfunctioning subsystem to be disconnected from the system. The selection circuit then blows the associated fuse for such subsystem and thereby isolates the malfunctioning subsystem from the system by uncoupling the malfunctioning subsystem from the bias buss lines or terminals and from the input/output line, and by uncoupling the malfunctioning subsystem by means of its associated enable circuit from the common bussing system. The selection circuits also automatically select another subsystem to take the place of the disabled subsystem, by automatically biasing the selected subsystem, coupling the selected subsystem to an input/output line and enabling its associated enable circuit to selectively couple such selected subsystem to the common bussing system. External to the black box system or package, one then sees each of the input/output lines coupled to an operable subsystem. In the event that the selected subsystem is also malfunctioning or that other of the enabled subsystems thereafter malfunction, further subsystems are selected to replace such malfunctioning systems in the manner described above.

In the embodiment described herein, the selection circuits are comprised of input decoder means for decoding an input signal in a first coded format into a second coded format; encoder means for altering the input signal coded in the second coded format such as by adding a constant coded in the second coded format to the input signal in the second coded format and encoding such altered signal into the first coded format; selective output means for selectively transferring either the input signal in the first coded format or the altered signal in the first coded format to a next selection circuit to provide an input signal in the first coded format for such next selection circuit and input/output encoder means coupled to input/output lines and responsive to the input signals in said second coded format for selecting an input/output line for an enabled subsystem, the input/output lines providing means for transmitting information in or out of the subsystem to which it is respectively coupled and for selecting a malfunctioning subsystem in conjunction with a fuse and fuse logic circuit to isolate a malfunctioning subsystem from the system. When a subsystem is enabled, the altered signal in the first coded format is transferred to the next selection circuit. When a subsystem is malfunctioning, the fuse of its associated selection circuit is blown and the input signal in the first coded format is transmitted directly to the next selection circuit. The subsystem associated with such next selection circuit then takes the place of the malfunctioning subsystem.

Still further objects and advantages of the invention will be apparent from the detailed description and claims and from the accompanying drawing illustrative of the invention wherein:

Figure 28A:
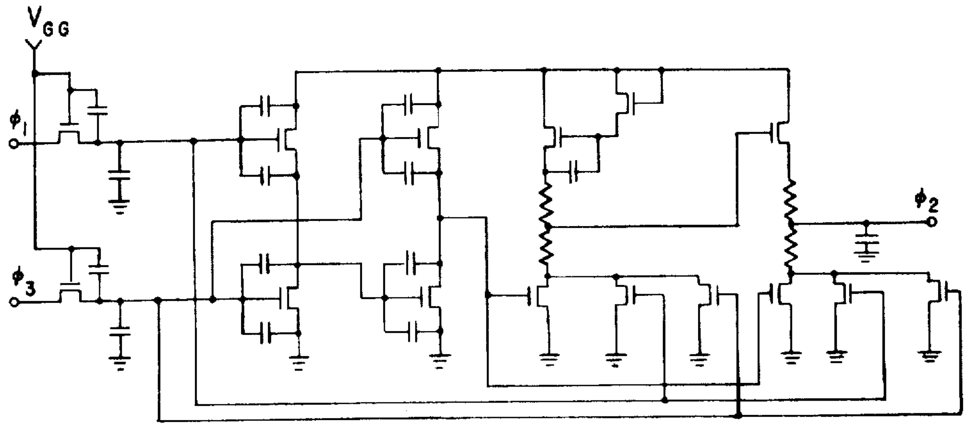
Figure 28B:
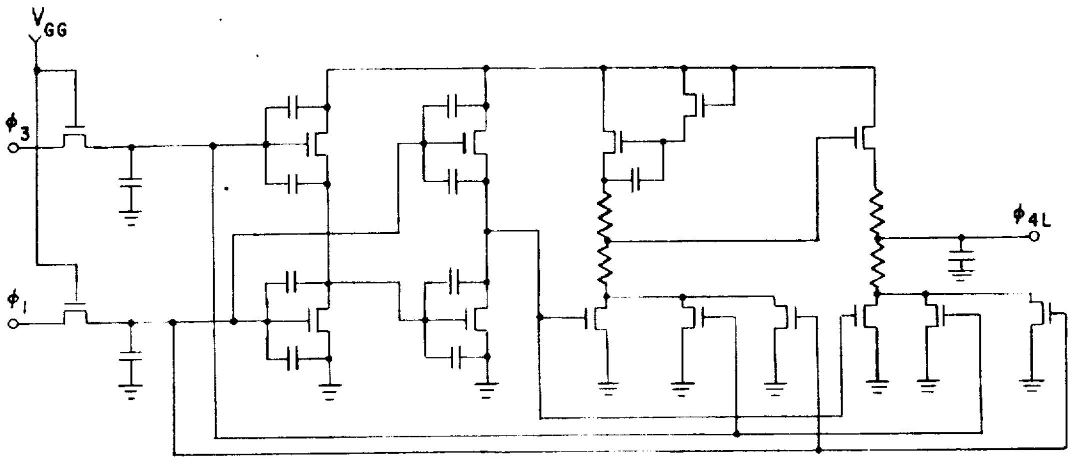
Figure 28C:
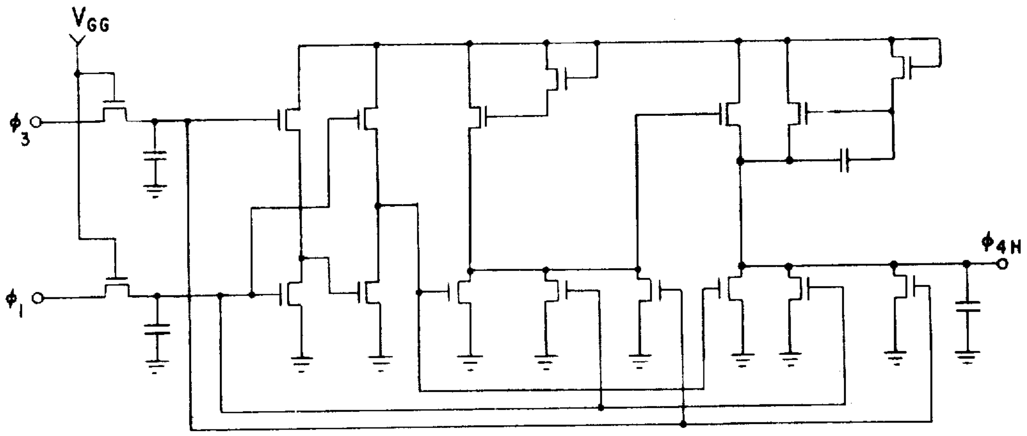
Figure 29:
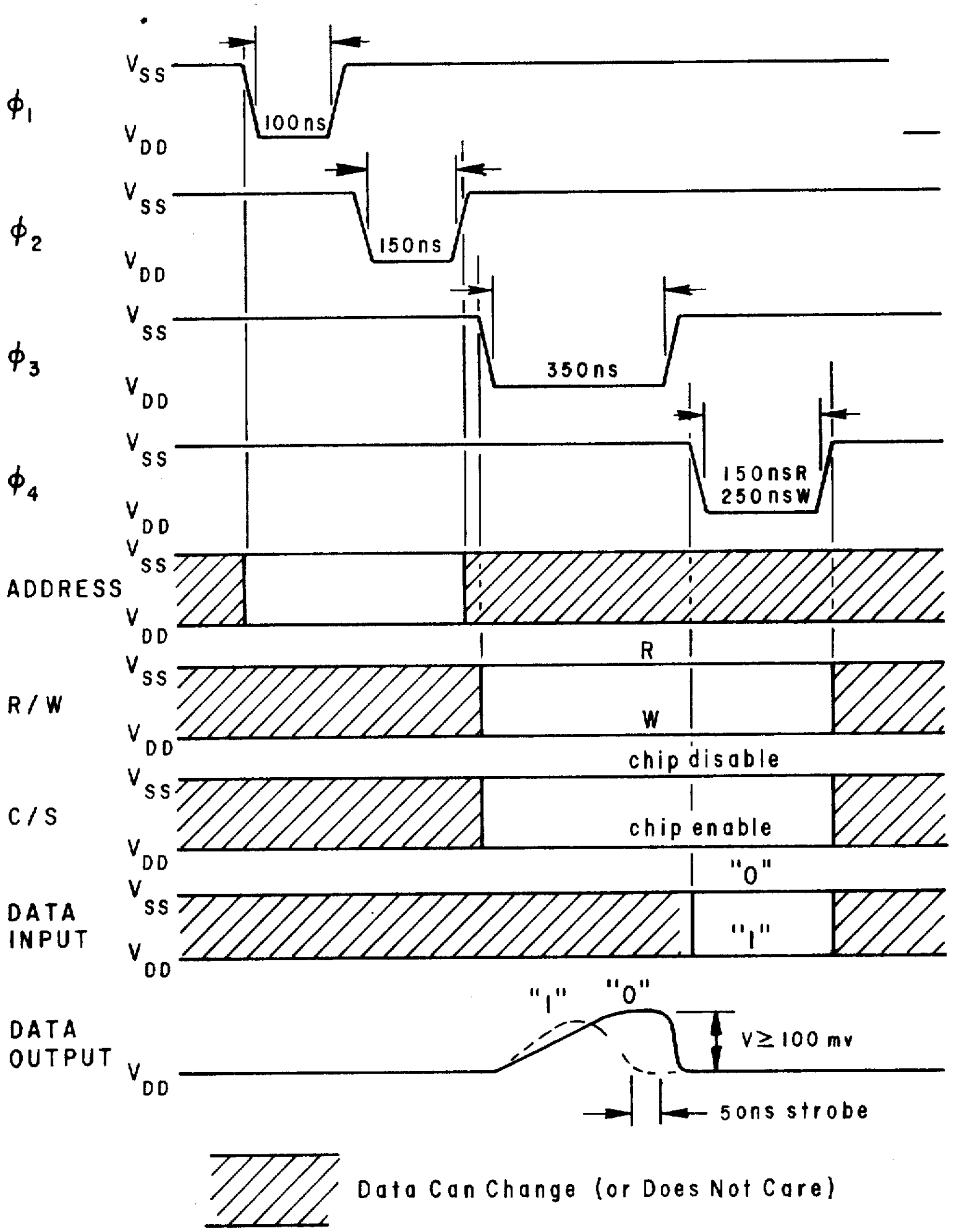
Figure 30:
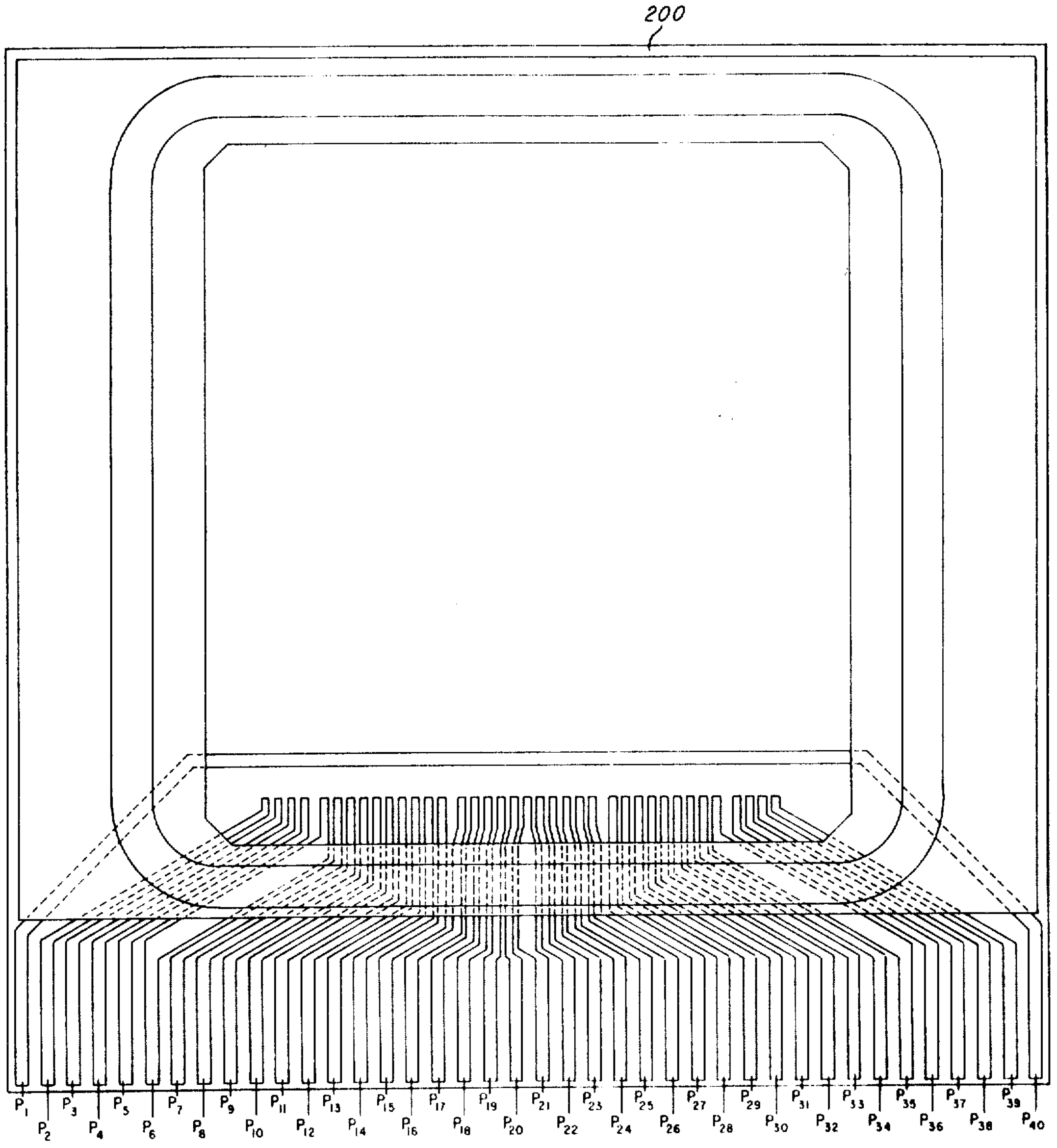

FIGS. 28*a-c* are circuit diagrams of the internal phased clock pulse generators utilized in an embodiment of the memory system;

FIG. 29 is a timing diagram showing the timing of the phased clock pulses, the control signals and the input/output signals for the memory subsystem;

FIG. 30 is a plan view of a metallized ceramic substrate on which one embodiment of the memory system is mounted and packaged.

SELECTION CIRCUITS

A complex electronic system such as a random access memory, or a stored program computer having a plurality of subsystems with predetermined interconnections is fabricated on a semiconductor substrate. Subsystem selection circuits in combination with subsystem enable circuits are interposed between one or more of the subsystems or a portion thereof and one or more common bussing systems. In one embodiment, the subsystems which meet desired performance specifications are automatically selected by the selection circuit and enabled to interconnect the subsystems into a desired system configuration, and the subsystems not meeting the desired performance specifications or meeting such specifications but not necessary for the desired final system configuration are left isolated from the completed system. The system may be permanently packaged or sealed. In the event that enabled subsystems thereafter malfunction, the selector circuits are operated externally of the package to automatically disable the malfunctioning subsystems and enable substitute subsystems which meet the desired performance specifications, but which were not originally necessary for completion of the system.

Figure 1:
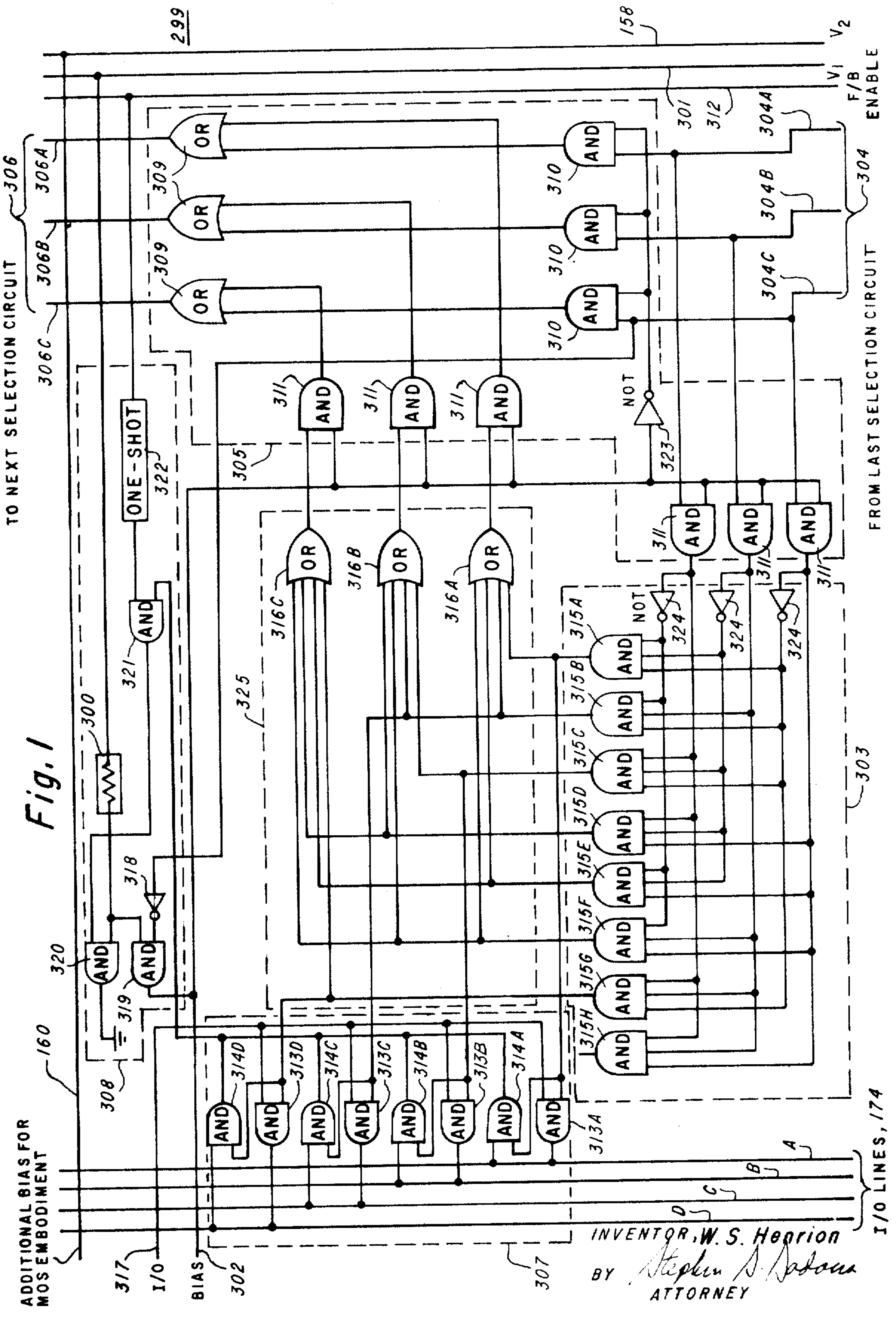
FIG. 1 is a logic diagram of an automatic selection/-self-repair circuit in accordance with the invention.

In one embodiment, as illustrated in FIG. 1, the selection circuits 299 each include a fuse 300 such as those comprised of fusable metal, fusable semiconductor material, semiconductor junctions which are capable of being blown to create an open circuit at the junction, or the like, coupling the subsystems and the enable circuits (such as to a $V_1$ bias voltage at 302) to bias buss lines or terminals (such as $V_1$ buss line 301). A signal is applied to one of input/output lines 174 which is coupled to a malfunctioning subsystem to select such malfunctioning subsystem to be disconnected from the system. Selection circuit 299 of FIG. 1 then blows fuse 300 for such subsystem when a fuse enable signal is applied to fuse enable line 312 and thereby isolates the malfunctioning subsystem from the system by uncoupling the malfunctioning subsystem at 302 from bias buss line 301 and from its input/output line, and by uncoupling the malfunctioning subsystem by means of its associated enable circuit from the common bussing system. The selection circuits also automatically select another subsystem to take the place of the disabled subsystem, by automatically biasing such selected subsystem, coupling such selected subsystem to an input/output line and enabling its associated enable circuit to selectively couple such selected subsystem to the common bussing system.

In the embodiment of FIG. 1, the illustrated selection circuit is comprised of input decoder means 303 for decoding an input signal applied to 304 in a first coded format into a second coded format; encoder means 325 for altering the input signal coded in the second coded format such as by adding a constant coded in the second coded format to the input signal in the second coded format (in the illustrated embodiment a "1" coded in the second coded format is added to the input signal in the second coded format) and encoding such altered signal into the first coded format; selective output means 305 for selectively transferring either the input signal in the first coded format or the altered signal in the first coded format to a next selection circuit at 306 to provide an input signal in the first coded format for such next selection circuit; and, input/output encoder means 307 coupled to input/output lines 174 and responsive to the input signals in said second coded format provided by decoder means 303 for selecting an input/output line for an enabled subsystem, input/output lines 174 providing means for transmitting information out of each enabled subsystem to which it is respectively coupled and for selectively adressing a malfunctioning subsystem in conjunction with fuse logic circuit 308 to isolate a malfunctioning subsystem from the system. When a subsystem is enabled, AND-gates 311 are enabled and the altered signal in the first coded format is transferred from encoder means 325 to the next selection circuit at 306. When a subsystem is malfunctioning, fuse 300 of its associated selection circuit is blown, AND-gates 310 are enabled and the input signal in the first coded format at 304 is transmitted directly through OR-gates 309 to the next selection circuit at 306. The subsystem associated with such next selection circuit takes the place of the malfunctioning subsystem while the malfunctioning subsystem is disabled.

Figure 2:
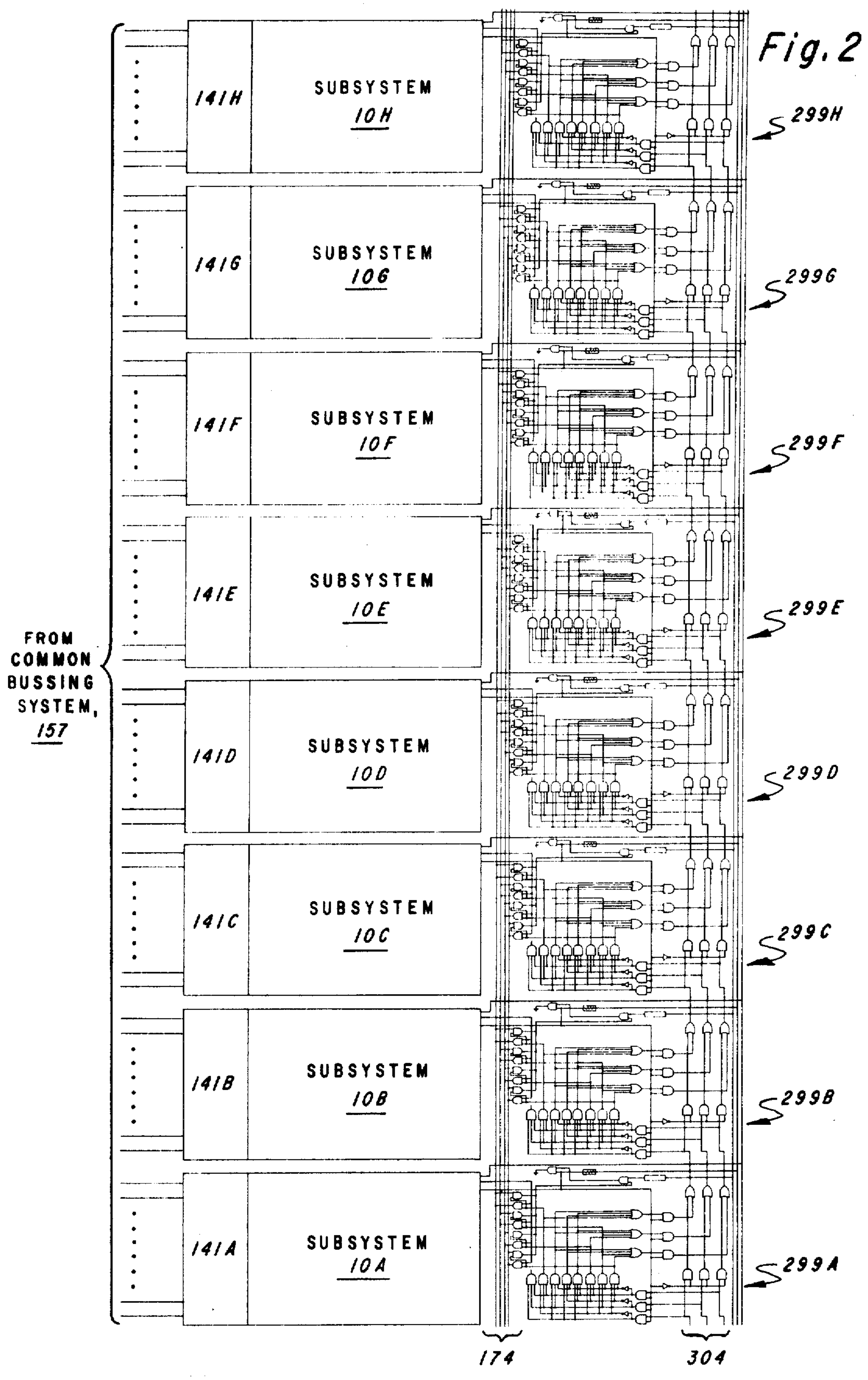
FIG. 2 is a logic diagram showing a plurality of subsystems and an associated plurality of automatic selection/self-repair circuits showing the interconnection thereof.

In order to better understand the operation of the system and in particular, selection circuits 299, consider the system illustrated in FIG. 2 read in conjunction with the selection circuit of FIG. 1. Illustrated in FIG. 2 are eight subsystems 10, each having associated with it an enable circuit 141 (which is discussed in detail in a later section) and a selection circuit 299. Considering the selection circuit of FIG. 1 as selection circuit 299A, assume for example, that no signal is applied to the code input 304 (*CBA*=000) for selection circuit 299A. Since the fuse 300 of selection circuit 299A has not been blown, AND-gates 311 are enabled and the 000 signal is transmitted to input decoder means 303. NOT-gates 324 of input decoder means 303 provide the complement (111) of the input signal (000). AND-gates 315 (H-A) decode the 000 input signal and its complement 111 in a first coded format into a second coded format (00000001); AND-gate 315A is the only one of AND-gates 315 (H-A) which has a binary 111 input and hence a one output. AND-gate 313A has two inputs, one from the subsystem input/output line 317 and the other from the output of AND-gate 315A. Since the output of AND-gate 315A is a binary one, AND-gate 313A is enabled and the output of AND-gate 313A transmits the output signals from subsystem 10A at 317 to the first input/output line 174A coupled to the output of AND-gate 313A. In addition, the coded output signal in the first coded format from OR-gates 316 (C-A) of encoder means 325 is a binary 001 since a binary one has been added by encoder means 325. The binary 001 signal in the first coded format is then transmitted via OR-gates 309 of selective output means 305 to the next selection circuit 299B in the first coded format at 306 (C–A). Now, considering the selection circuit of FIG. 1 as selection circuit 299B, the input signal at 304 (C–A) is 001. Since fuse 300 of selection circuit 299B has not been blown AND-gates 311 are enabled; thus, the 001 signal at 304 (C–A) in the first coded format is transmitted to decoder 303. Again, NOT-gates 324 of decoder 303 provide the complement (110) of the input (001) so that decoder 303 provides a decoded output of 00000100 from AND-gates 315 (H–A). Since AND gate 315C is the only AND-gate which has a one output AND-gate 313B is enabled and the input/output of the second subsystem 10 coupled to selection circuit 299B at input/output 317 is thereby coupled to the second input-/output line 174B.

In addition, the coded output signal in the first coded format from OR-gates 316 (C–A) of encoder means 325 is a binary 010 since a binary 1 has been added by encoder means 325. The binary 010 signal in the first coded format is transmitted via OR-gates 309 of selective output means 305 to the next selection circuit 299C in the first coded format at 306 (C–A). In a similar manner, the coded input to selection circuit 299C is the binary 010 signal from selection circuit 299B so the output of selection circuit 299C is a binary 011 when the fuse 300 of selection circuit 299C has not been blown; the input to selection circuit 299D is the binary 011 signal from selection circuit 299C and the output from selection circuit 299D to selection circuit 299E is a binary 100 when fuse 300 of selection circuit 299D is not blown.

As the fuses 300 of selection circuits 299A–D are not blown, subsystem 10A coupled to selection circuit 299A is also coupled to input/output line 174A, subsystem 10B coupled to selection circuit 299B is also coupled to input/output line 174B, subsystem 10C coupled to selection circuit 299C is also coupled to input/output line 174C and subsystem 10D coupled to selection circuit 299D is also coupled to input/output line 174D. Subsystems 10E–H coupled to selection circuits 299E–H, respectively, are not coupled to any input-/output lines as only four input/output lines, enabled by binary signals 000–011, are provided. In addition, considering fuse logic circuit 308 as illustrated in FIG. 1, only subsystems 10A–D are biased as the input of NOT-gate 318 is a 1 when the binary signal at 304 is four or more (100–111) thereby disabling AND-gate 319 so that no bias is provided for an associated subsystem at 302 (in this case subsystems 10E-10H). At this point, with no fuses blown, each of subsystems 10A-D is provided with an input/output line 174 and is coupled to bias line 301 at 302; and, each of subsystems 10E–H is not provided with an input/output line and is uncoupled from bias line 301 at 302.

Let us now consider how the system is automatically repaired in the event that one of subsystems 10A–D in the above arrangement is malfunctioning. Consider for example, that subsystem 10B in FIG. 2 begins to malfunction; and, consider the selection circuit 299 of FIG. 1 as selection circuit 299B. Subsystem 10B would be readily detected as a malfunctioning subsystem when the output from input/output line 174B, which is presently coupled to subsystem 10B in the above arrangement, does not provide a proper output. As far as the system is concerned, it really makes no difference which subsystem is coupled to which input/output line; all that is important to repair the system is the fact that whichever subsystem is presently coupled to input/output line 174B in the present example is malfunctioning. To repair the system a logical 1 is applied to input/output line 174B (known to be coupled to a malfunctioning subsystem) and to fuse/blow enable line 312. AND-gate 313B coupled to input/output line 174B transmits the logical 1 to AND-gate 321 of fuse/blow logic circuit 308. The fuse/blow enable signal is converted into a pulse by one-shot multivibrator 322 which pulse is also applied to AND-gate 321 to generate a logical 1 pulse output from AND-gate 321 to AND-gate 320. The other input to AND-gate 320 is coupled to bias voltage $V_1$ by fuse 300. AND-gate 320 is thus enabled by the logical 1 output pulse from AND-gate 321 causing bias voltage $V_1$ to go to ground through fuse 300 which blows fuse 300 of selection circuit 299B. This causes the bias at 302 to subsystem 10B to be uncoupled from bias voltage $V_1$ since AND-gate 319 is disabled when the $V_1$ bias to AND-gate 319 is removed by fuse 300 being blown. In addition, AND-gates 311 of selective output means 305 are disabled and AND-gates 310 are enabled as NOT-gate 323 of selective output means 305 now provides a logical 1 signal to AND-gates 310. The binary 001 input signal applied at 304 (C–A) of selection circuit 299B is then transmitted via OR-gates 309 directly to selection circuit 299C from 306 (C–A). As a result of the above procedure, the binary input signal to selection circuit 299A is still 000 and subsystem 10A is biased and coupled to input/output line 174A; the fuse of selection circuit 299B has been blown so that subsystem 10B is unbiased (AND-gate 319 being disabled) and not coupled to any input/output line (AND-gates 311 being disabled); the input to selection circuit 299C is not 001 so that subsystem 10C is biased and coupled to input/output line 174B; the input signal to selection circuit 299D is a binary 010 so that subsystem 10D is biased and coupled to input/output line 174C and the input signal to selection circuit 299E is now a binary 011 so that subsystem 10E is biased and coupled to input/output line 174D. The fuses of subsystems F–H have not been blown; subsystems F–H remain unbiased, uncoupled from input/output lines and still available as further substitute systems.

OPERATION OF THE ENABLE CIRCUITS BY THE SELECTION CIRCUITS

Figure 3:
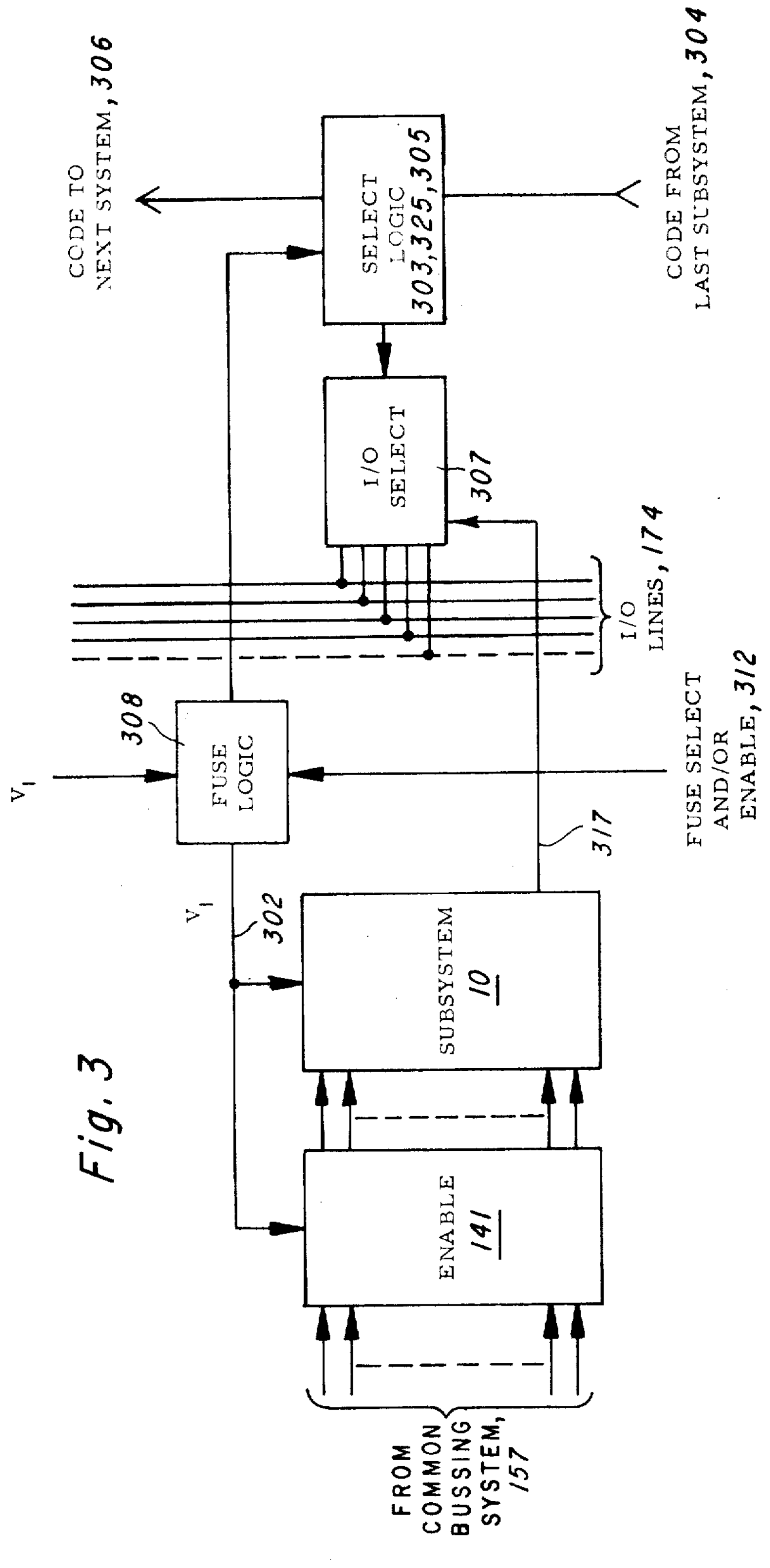
FIG. 3 is a block diagram illustrating the relationship between an automatic selection circuit, a respective subsystem and a respective enable circuit.

As illustrated in FIG. 3, additional input, output, intersubsystem, clock and bias signals are transmitted to and from each subsystem 10 by common bussing system 157 via enable circuits 141 coupling each subsystem 10 to common bussing system 157. Enable circuits 141 are comprised of sets of electronic switches connected together whereby a large number of interconnections between any of subsystems 10 and common bussing system 157 are closed simultaneously. By unbiasing an enable circuit 141, its associated subsystem 10 is selectively disconnected from common bussing system 157 to isolate such associated subsystem 10 from common bussing system 157 and thereby from the system; by biasing an enable circuit 141, its associated subsystem 10 is selectively connected to common bussing system 157 to complete the desired system. The same bias voltage $V_1$ which is applied to the subsystem 10 from bias line 301 at 302 provides the selective bias for the enable circuit associated with such subsystem as well. Thus, when fuse 300 of a selection circuit 299 is blown, AND-gate 319 of fuse logic circuit 308 unbiases the associated enable circuit 141 as well as the associated subsystem 10 whereby the associated subsystem 10 is isolated from common bussing system 157 as well as from the bias voltage at 302 and from the input/output lines 174.

In preferred semiconductor system embodiments described herein, the enable circuits are integrated into the monolithic semiconductor system along with the subsystem circuits and selection circuits. Both metal-insulator-semiconductor field effect transistor enable circuits (MOS) and bipolar transistor enable circuits (for example, TTL) may be used in that it is preferable to utilize MOS enable circuits in conjunction with MOS subsystems and selection circuits and to utilize bipolar enable circuits in conjunction with bipolar subsystems and selection systems.

Figure 4:
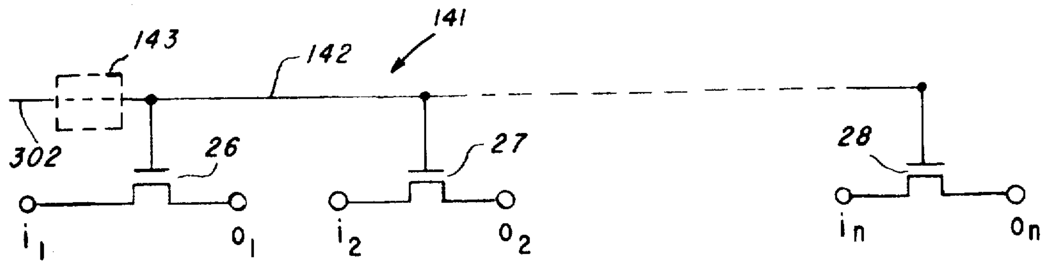
FIG. 4 is a circuit diagram illustrating an insulated-gate field effect transistor enable circuit utilized in accordance with an embodiment of the invention.

In one embodiment, shown in FIG. 4 the MOS enable circuits are comprised of N field effect transistors, where N is the total number of conductors transmitting electrical signals from the common bussing system to the circuits of a subsystem 10 and from the circuits of such subsystem 10 to common bussing system 157 and requiring disconnection for isolation of such subsystem 10 from the system. For purposes of illustration, the first field effect transistor 26, the second field effect transistor 27 and $N^{th}$ field effect transistor 28 are shown. The outputs $o_1, o_2, \ldots o_N$ provided by the drains of transistors 26, 27, . . . 28, respectively, are connected to the various subsystem circuits as required for isolation of the memory subsystem. The sources of field effect transistors 26, 27, . . . , 28 are provided with signals $i_1, i_2, \ldots, i_N$, respectively, which are outputs from common bussing system 157. It should be here noted that the source/drain designation of the field effect transistors is not fixed and in other embodiments electrical signals are transmitted from the various subsystem circuits to the common bussing system utilizing the same enable circuit.

A common gate, represented in the circuit diagram of FIG. 4 by the numeral 142 is provided over the channel regions of all of the field effect transistors 26, 27, . . . , 28 comprising the electronic switches of enable circuit 141. Common gate 142 is biased by the application of a gate voltage $V_{GG}$ from 302 of the associated selection circuit 299. This is accomplished by the closing of the path between voltage $V_{GG}$ from 302 and voltage $V_1$ at 301 thereby completing an electrically conductive path through the selection circuit 299 to 302 and hence to common gate 142 between applied voltage $V_{GG}$ and common gate 142.

When the path between voltage source $V_{GG}$ and common gate 142 is broken by the blowing of fuse 300 of the associated selection circuit, no bias is provided at 302 for common gate 142 and the associated subsystem 10 remains isolated from the remainder of common bussing system 157 and hence from the remainder of the system, as no current will flow between the inputs $i_1, i_2, \ldots, i_N$ and the outputs $o_1, o_2, \ldots o_N$, respectively.

In a preferred system, a special field effect transistor automatic grounding circuit is provided which automatically effectively grounds gate 142 of the enable circuit when no bias voltage is being transmitted from 302.

Figure 5:
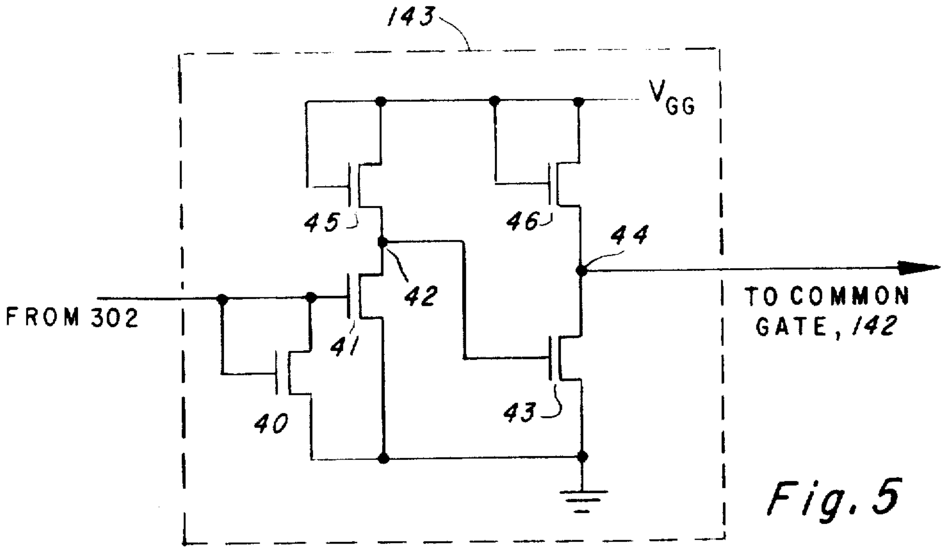
FIG. 5 is a circuit diagram illustrating an insulated-gate field effect transistor automatic grounding circuit utilized in conjunction with the insulated-gate field effect transistor enable circuit of FIG. 4.

The automatic grounding circuit is illustrated in detail in FIG. 5. A gate-shorted-to-drain field effect transistor 40 provides a high resistance path to ground. In this circuit, when $V_{DD}$ (approximately negative 16 volts) from $V_1$ bias line 301 is transmitted by the selection circuit 299 to 302, the high resistance path to ground provided by transistor 40 is effectively overcome, providing a gate bias voltage for turning on field effect transistor 41. The output of transistor 41 at terminal 42 is then applied to the gate of field effect transistor 43 which is then turned off. Field effect transistor 43 is connected to common gate 142 at terminal 44. The drains of transistors 41 and 43 are coupled to voltage supply $V_{GG}$ (about negative 24 volts in this circuit) by gate-shorted-to-drain field effect transistors 45 and 46 which act as load resistors for transistors 41 and 43, respectively. Consequently, when the selection circuit completes the path between $V_{DD}$ line or terminal strip 301 and 302, $V_{GG}$ is applied to gate 142 which turns on the field effect transistors comprising enable circuit 141 and enables subsystem 10. When the path through the selection circuit 299 between $V_{DD}$ line 301 and subsystem bias 302 is disabled, the voltage to common gate 142 is kept at a zero logic level (less than one threshold voltage $V_T$) by the one megaohm resistance between terminal 170 and ground provided by transistor 40 since transistor 41 is turned off, transistor 43 is turned on, and terminal 44 is effectively grounded. Terminal 44 being effectively grounded, the field effect transistors (26, 27, . . . ,28, shown in FIG. 4) are turned off and thereby the subsystem 10 is disconnected from common bussing system 157.

Figure 6:
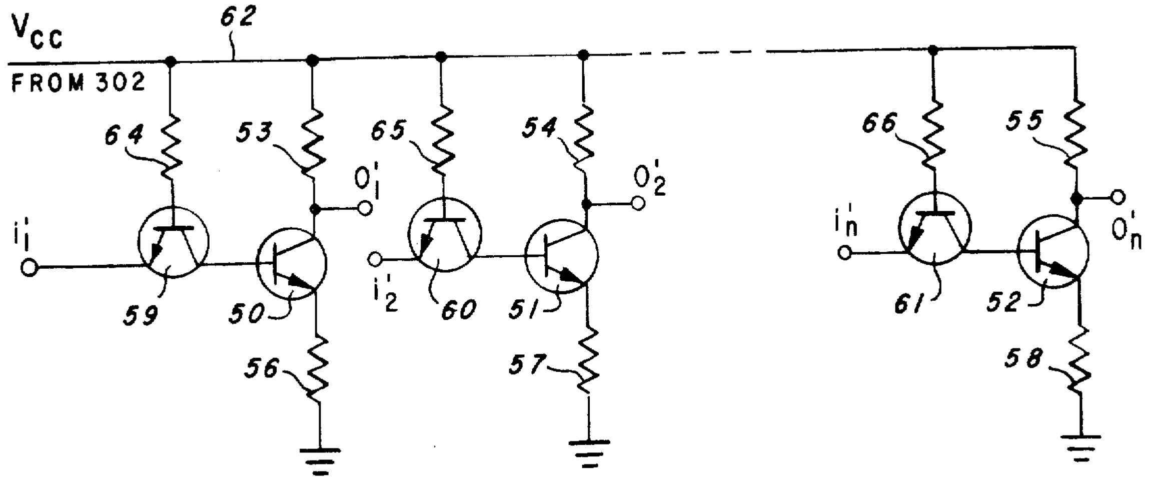
FIGS. 6 and 7 are circuit diagrams illustrating bipolar enable circuits utilized in accordance with an embodiment of the invention.
Figure 7:
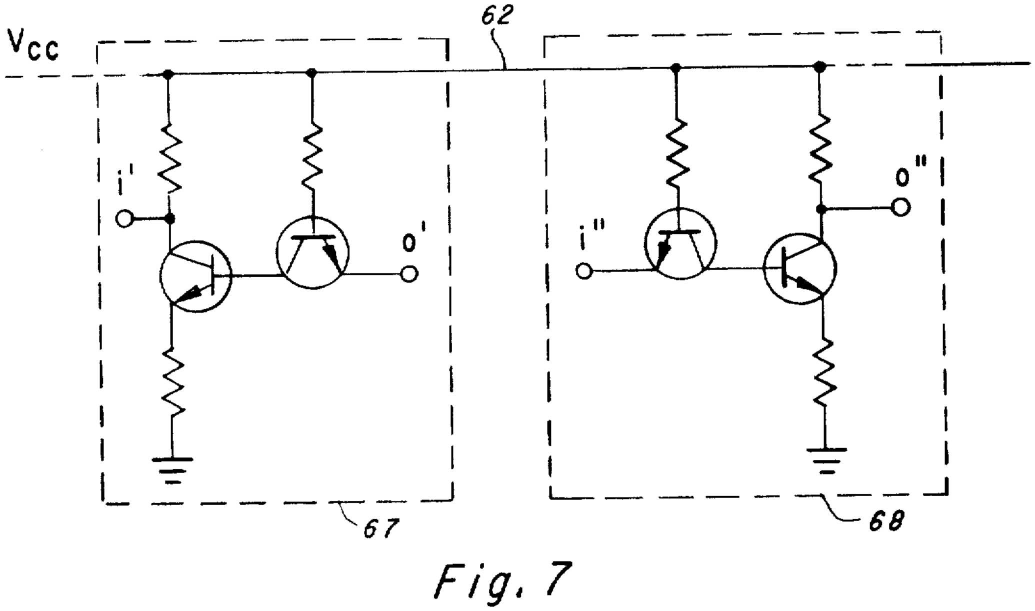

Another semiconductor enable circuit, illustrated in FIG. 6, is a bipolar transistor embodiment utilized primarily in bipolar transistor systems such as TTL. The bipolar enable circuit which performs essentially the same function as the MOS enable circuit is comprised of n groups of two interconnected bipolar transistors where n is equal to the total number of conductors transmitting signals to or from the subsystem with which the enable circuit is associated and common bussing system 157. The outputs $o_1', o_2', \ldots, o_n'$, provided by the collectors of bipolar transistors 50, 51, . . . , 52 of each group respectively, are connected to the various inputs of the associated subsystem as required for isolation of that subsystem from common bussing system 157. The collectors of transistors 50, 51, . . . , 52 are coupled by selection circuit 299 to a collector supply voltage $V_{CC}$ (approximately +5 volts for TTL) at 302 by resistors 53, 54, . . . , 55, respectively, and the emitters of transistors 50, 51, . . . , 52 are each coupled to ground by resistors 56, 57, . . . , 58. The outputs $o_1', o_2', \ldots, o_n'$ provided at the collector terminals of transistors 50, 51, . . . , 52, respectively, are adjusted to suit the requirements of the subsystem with which the enable circuit is associated by varying the values of resistors 53 and 56, 54 and 57, 55 and 58, etc.. The emitters of transistors 59, 60, . . . , 61 of each group provide means $i_1', i_2', \ldots, i_n'$, respectively, for connecting the common bussing systems to the enable circuit whereby electrical signals are inputted to the associated subsystem when the transistor switches of the enable circuit are closed. The collectors of transistors 59, 60, . . . , 61 are connected to the bases of transistors 50, 51, . . . , 52, respectively, whereby transistors 50, 51, . . . , 52 are turned on when an input voltage is applied to emitter inputs $i_1', i_2', \ldots, i_n'$ and the bases of transistors 59, 60, . . . , 61 are biased. The bases of transistors 59, 60, . . . , 61 are coupled to common connector 62 supplying voltage $V_{CC}$ to the enable circuit from a selection circuit 299 at 302. When a collector voltage $V_{CC}$ is transmitted from bias line 301 through the selection circuit 299 to 302 and hence to common conductor 62, the bases of transistors 59, 60, . . . , 61 are biased and the associated subsystem is enabled. By reversing the input *i* and output o terminals of any group, the circuit is utilized as a switch in the enable circuit for output signals transmitted from the associated subsystem to the common bussing systems. For example, illustrated in FIG. 7 are two switches 67 and 68 of a bipolar enable circuit. Switch 68 is the same as those switches described with respect to FIG. 6. Thus, for a signal being transmitted from common bussing system 157 to an enabled subsystem, the signal is applied to input terminal *i''* and is introduced into the subsystem from terminal *o''*. Switch 67, however, has been reversed so that signals transmitted from the associated subsystem to common bussing system 157 are applied to terminal *o'* and transmitted to common bussing system 157 from terminal *i'*.

MEMORY SYSTEM ON A SLICE

Figure 8:
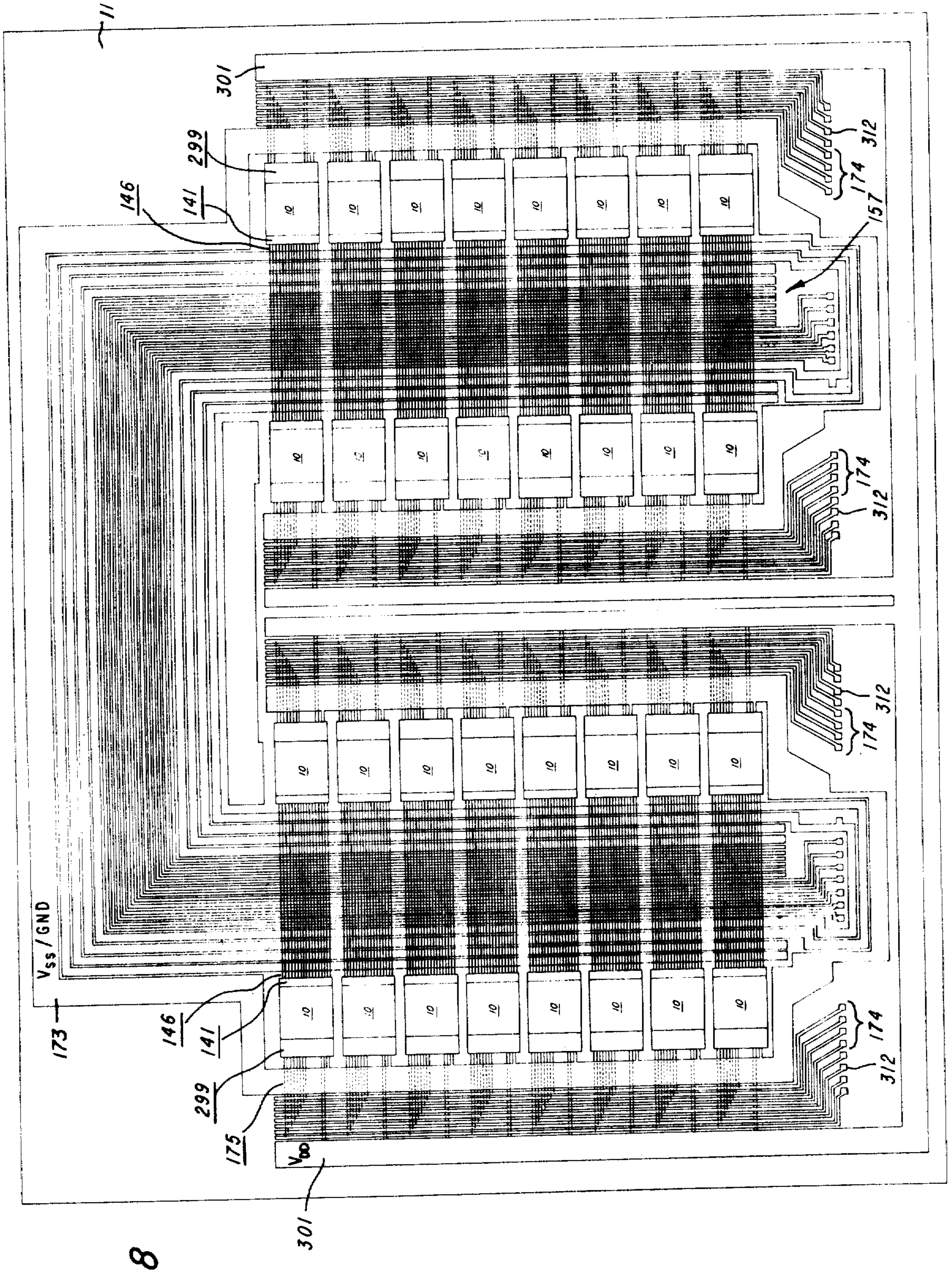
FIG. 8 is a plan view of a random access memory system in accordance with the invention.

One complex system embodying the present invention is an insulated gate field effect transistor random access memory system fabricated as a monolithic structure in a semiconductor slice, for example, formed of silicon, germanium or compound semiconductor material adjacent to its surface. As illustrated in FIG. 8, a semiconductor memory system fabricated on an approximately one-inch square semiconductor substrate 11 provides 16,384 bits of random access storage. The preferred system is comprised of 32 identical subsystems designated generally by the numeral 10 from which seventeen subsystems meeting the desired performance specifications are selected to provide storage of 1,024 words having 16 bits each. The memory system includes a common bussing system 157, input/output conductors 174, for example, gold or aluminum, or other conductive materials positioned on the substrate in electrically insulated relation to the substrate, diffused tunnel electrical interconnects 146 and 175, and an enable circuit 141 and selection circuit 299 associated with each of the 32 subsystems 10.

Subsystems 10, each being complex systems in themselves and performing large numbers of functions, are arranged in four columns with eight subsystems in each column similar to the arrangement of FIG. 2. Common buss conductor system 157 is fabricated on substrate 11 such that all subsystems 10 have access thereto.

In the illustrated embodiment, common bussing system 157 is utilized to transmit address signals, clock signals, etc. to memory subsystems 10. Each subsystem 10 is coupled to common bussing system 157 by a set of diffused interconnects 146 and an enable circuit 141.

Conductors 174 are utilized to transmit input and output signals to and from subsystems 10. There are sixteen conductors 174, four conductors being associated with each column of eight subsystems, the conductors 174 being automatically selected for operating subsystems by selection circuits 299. Since only 16 of the 32 subsystems 10 are necessary for completion of the 16,384 bit memory system, only 16 of subsystems 10 are selectively coupled to input/output conductors 174.

Referring to the left half of semiconductor substrate 11, illustrated in FIG. 2, enable circuits 141 coupling each subsystem to common bussing system 157 provide means for isolating its respective subsystem from common bussing system 157. Generally, enable circuits 141 are comprised of sets of electronic switches which selectively open and close the conductive paths of the sets of interconnects 146 between a subsystem 10 and common bussing system 157, e.g., simultaneous interconnect. By biasing or unbiasing one of enable circuits 141 via its associated selection circuit 299, an entire subsystem 10 is respectively connected or disconnected from the common bussing system, from all bias means and from an input output conductor 174 in a single step by applying a proper selection code to its selection circuit 299 or blowing the fuse 300 of its selection circuit 299. In addition, by manually biasing or unbiasing enable circuits 141 any one or more of subsystems 10 are isolated from or connected to common bussing system 157 and hence from the remainder of the system, for example, for test purposes. Since the memory system in an MOS system, MOS enable circuits of FIG. 4 are utilized. The specific MOS enable circuit embodiment and selection circuit embodiment utilized in the present memory system are described in further detail later in this description.

METHODS OF TESTING AND REPAIR

As indicated briefly in the introduction, several modes and methods of initial testing of the system and of repairing the system of the invention are available. Let us first consider methods of initially testing the system. With no bias applied to the system, AND-gates 313 and 314 of each selection circuit 299 are disabled and therefore no subsystem 10 is coupled to an input-/output conductor 174. In addition, with no bias being applied to the selection circuits 299, all subsystems 10 are unbiased and the enable circuits 141 are unbiased so that subsystems 10 are each completely isolated from the system including isolation from common bussing system 157. In this mode, it is readily seen that subsystems 10 can be individually tested without affecting the remainder of the system; nor will any defects in one of subsystems 10 affect the test results of another of subsystems 10.

Figure 9:
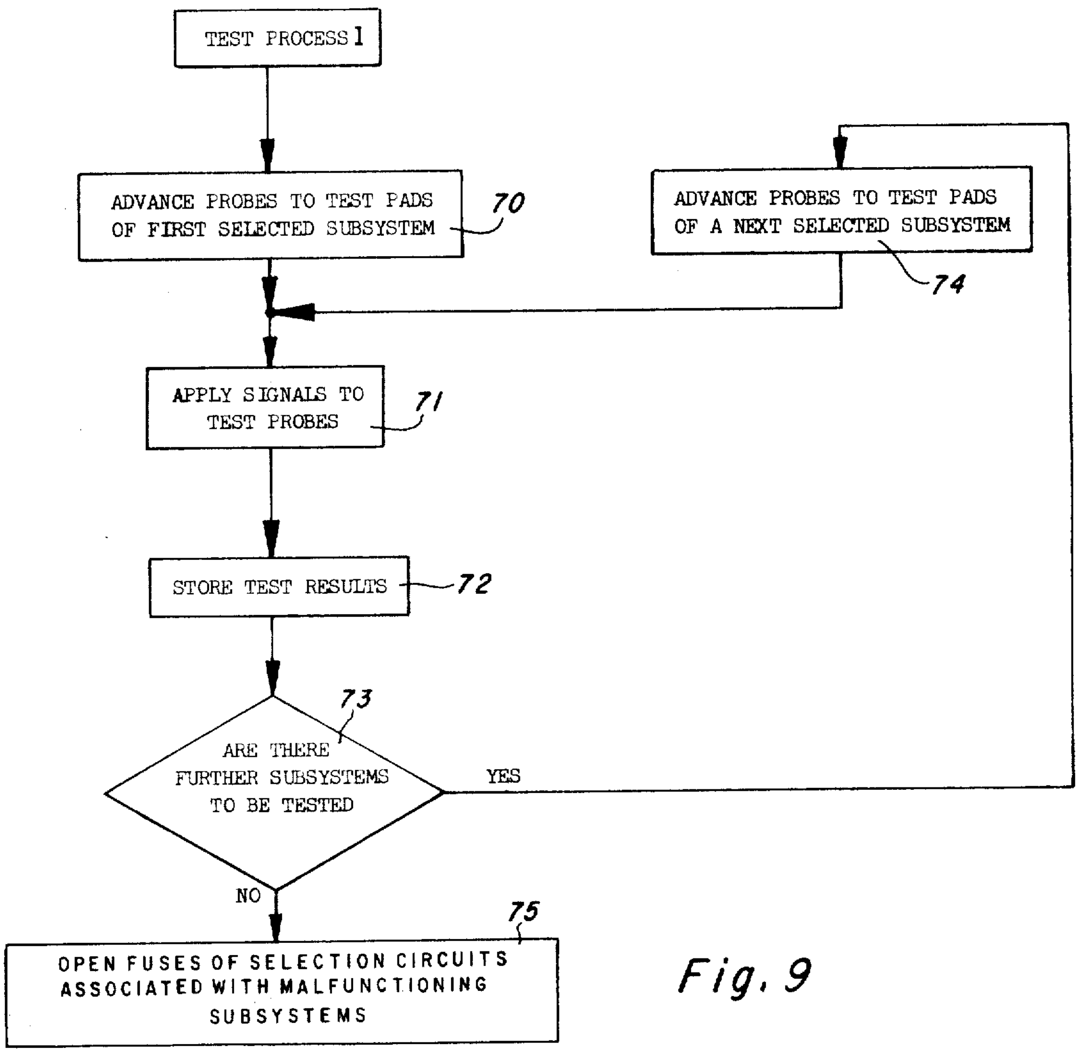
FIGS. 9 and 10 are flow charts illustrating initial test processes for the subsystems of the invention.

One method of initially testing the system shown in FIG. 9 is to individually probe each subsystem 70 with individual biases and test signals applied 71 directly to the subsystem being tested (at subsystem test pads, for example) and monitor the results of the tests at the subsystem input/output 317. If the subsystem complies with predetermined desired characteristics for such subsystem, fuse 300 of its associated selection circuit 299 is left intact. If the subsystem fails to meet its predetermined desired characteristics, fuse 300 of its associated selection circuit 299 is electrically blown or mechanically opened 75 whereby such subsystem is permanently isolated from the remainder of the system. Thus, in the memory system of FIG. 8 each subsystem 10 could be individually probed and as long as four subsystems in each column meet the predetermined test characteristics, a 16,384 bit memory system can be completed. When more than sixteen subsystems meet the desired test characteristics, the additional subsystems are available as replacement subsystems in the self-repair mode. In the test process of FIG. 9 all subsystems are tested 73, 74 and the test results stored 72 and thereafter the fuses for malfunctioning subsystems are opened 75. Alternately, the fuse for a malfunctioning subsystem could be opened electrically or mechanically immediately after that subsystem has been probed before commencing with the testing of further subsystems.

Before continuing with the discussion of the methods of testing, it should be noted here that in the selection circuit embodiment of FIG. 1 and the memory system embodiment of FIG. 8, a three-bit binary code is transmitted from one selection circuit to the next in order to select four (binary codes 000–011) out of eight subsystems in each column. In other embodiments, however, it can be readily seen that any number of bits could be transferred from one selection circuit to the next. Thus, for example, where the number of code lines from selection circuit to selection circuit is increased to four bits, binary codes from zero (0000) to 16 (1111) are used to select eight (binary codes 0000 – 0111) of 16 subsystems whereby the subsystems of the first and second columns and the third and fourth columns of FIG. 8 are considered as a single column of 16 subsystems from which eight of those subsystems need be selected. The input/output lines 174 of both the first and second columns would be coupled to each of the selection circuits of the third and fourth columns. Thus, the selection circuits 299 of the first and second columns would select one of eight input/output lines for each of eight subsystems in the first and second columns combined which meet the desired test characteristics and the selection circuits 299 of the third and fourth columns would select one of eight input/output lines 174 for each of eight subsystems in columns 3 and 4 which meet the desired test characteristics. Furthermore, by adding an additional fifth-bit to the code transmitted from one selection circuit to another counting from one (00000) to 32 (11111) all 32 selection circuits could be interconnected by their code lines and each selection circuit could be coupled to each of the total 16 input/output lines 174 such that all four of the columns of subsystems 10 are considered as a single column of 32 subsystems whereby 16 subsystems (binary codes 00000 – 01111) are selected out of 32. One reason why the above systems are desirable is that the probability of obtaining a total of, for example, 20 subsystems meeting the desired test characteristics out of 32 is higher than the probability of obtaining two sets of subsystems meeting the desired test characteristics out of sixteen subsystems which in turn is higher than the probabilty of obtaining five subsystems meeting the desired characteristics out of eight subsystems in each of four columns. The number of code lines and input/output lines 174 may also be increased or decreased to accommodate more or less subsystems.

Figure 10:
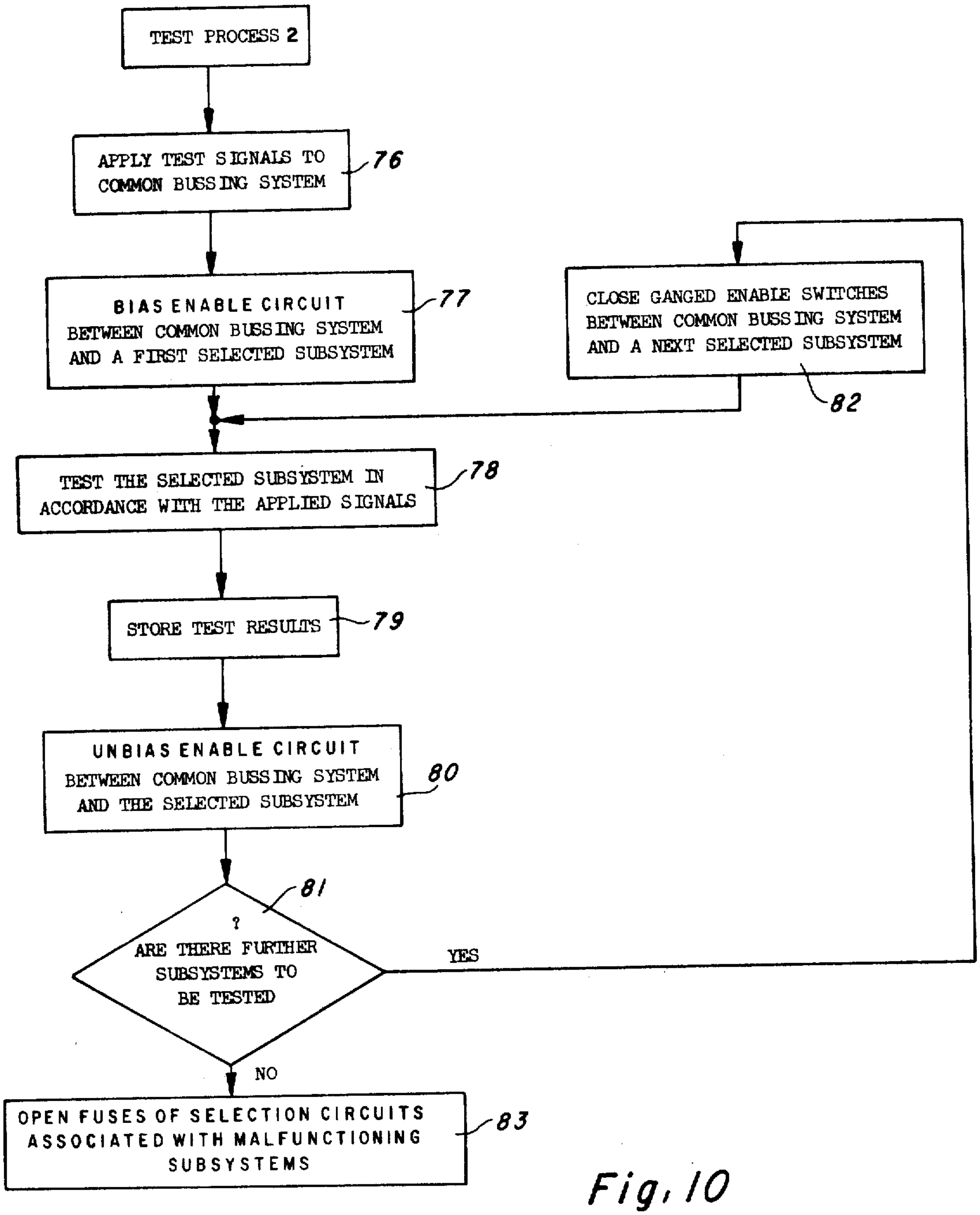

Another method of testing the subsystems 10 is to apply a bias directly to a subsystem 10 and its associated enable circuit 77, 82 and apply the test signals 78 directly to signal pads of common bussing system 157 as shown in the flow chart of FIG. 10. Since only one subsystem is enabled to common bussing system 157 at a time, the remaining subsystems are still isolated from the common bussing system and from each other by their respective enable circuits 141 and therefore do not affect the testing of the single enabled subsystem. As with the first method of testing described above, when a subsystem is found to meet its desired test characteristics, the fuse 300 of its associated selection circuit 299 is allowed to remain intact. The fuses 300 of selection circuits 299 associated with malfunctioning subsystems are either electrically blown or mechanically opened 83 whereby such malfunctioning subsystems are permanently isolated from the system.

By the above methods of initial testing, subsystems not meeting their desired test characteristics are eliminated immediately. The system is then ready to be packaged; and, if further subsystems thereafter begin to malfunction, subsystems which are not initially connected into the system by selection circuits 299, but which still have fuses 300 of their associated selection circuits 299 intact may be substituted for such thereafter malfunctioning subsystems in the self-repair mode.

Figure 11:
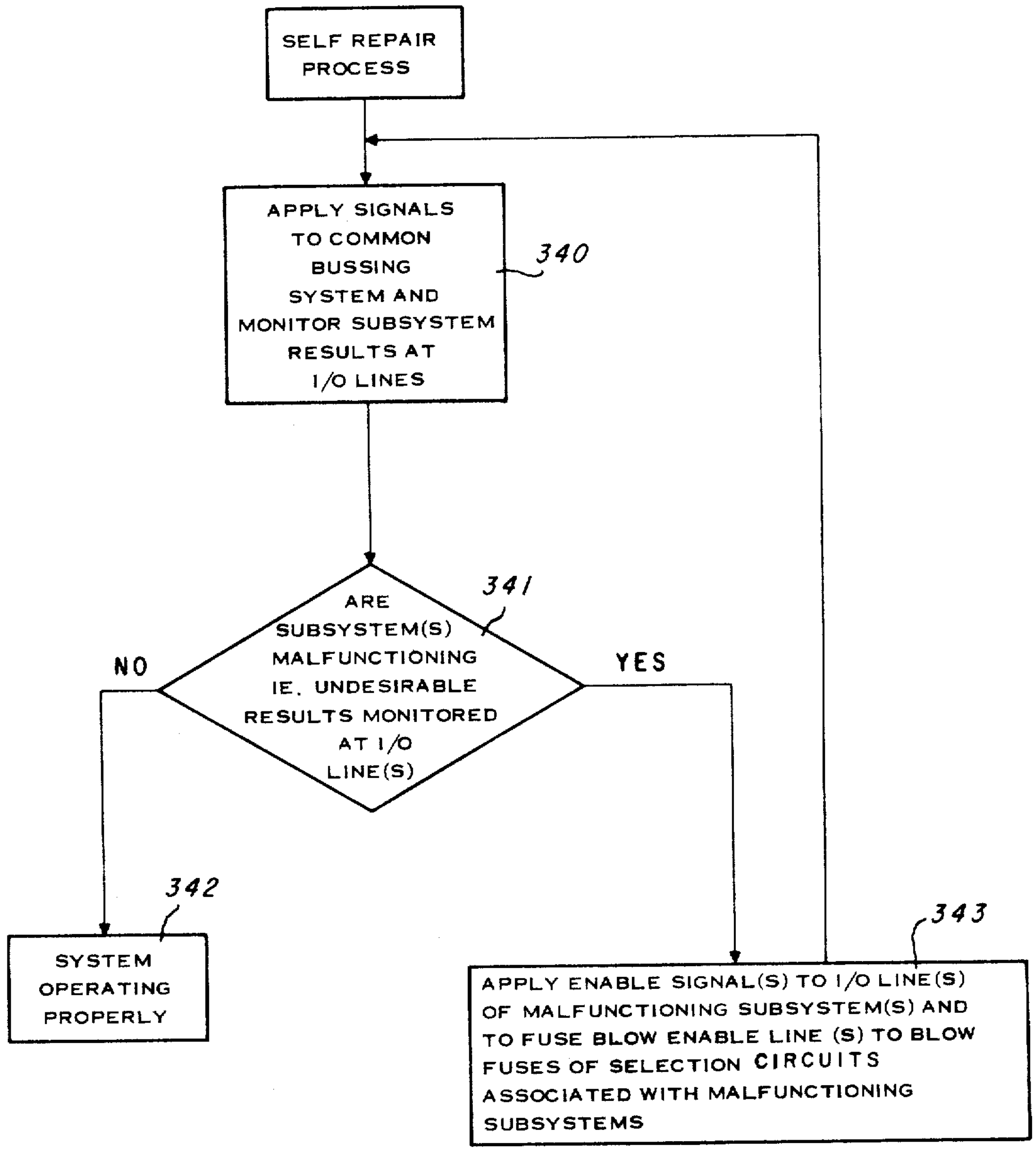
FIG. 11 is a flow chart illustrating the method of automatically self-repairing the system in accordance with the invention or initially testing the system utilizing the automatic selection/self-repair circuits.

A further method of testing which is identical to the self-repair mode illustrated in FIG. 11, takes full advantage of selection circuits 299 and the system flexibility. As previously described with respect to FIG. 2, initially the subsystem selection circuits, when biased, automatically select enough subsystems to complete the final system regardless of whether the subsystems meet the required performance specifications and regardless of whether the system has already been packaged or sealed. Considering each column of subsystems 10 in the memory system of FIG. 8 as the column of subsystems illustrated in FIG. 2, initially, with no fuses blown, the first four subsystems 10 in each of the four columns are enabled to provide the desired 16 subsystem memory of 1,024 16-bit words. It is assumed that each of these 16 initially selected subsystems meet the predetermined desired test characteristics. Test signals are applied 340 to common bussing system 157 and the sixteen input/output lines 174 are monitored to determine 341 whether each of the 16 subsystems presently coupled to the sixteen input/output lines 174 do in fact meet the desired test characteristics. If all 16 subsystems presently coupled to the common bussing system 157 via their associated enable circuits 141 and to the 16 input/output lines 174 meet the desired test characteristics (that is, none of the 16 subsystems are malfunctioning then the test is complete 342 and the desired memory system achieved. If, however, one or more of the subsystems presently coupled to the 16 input/output lines is malfunctioning, then the particular input/output lines to which such malfunctioning subsystems are coupled will indicate undesirable results. In order to disable and isolate such malfunctioning subsystems from the system 343, logical 1 signals are applied to the input/output lines associated with such malfunctioning subsystems (i.e., the input/output lines on which the undesirable results are detected) and to the fuse blow enable line or lines for the particular column(s) in order to blow the fuses 300 of the selection circuits 299 associated with the malfunctioning subsystems. The selection circuits with blown fuses now have AND-gates 311 disabled and AND-gates 310 enabled as previously described with respect to selection circuit 299B of FIG. 2 so that the selecting and enabling codes (000–011) are transmitted to selection circuits which will have their fuses intact, whereby replacement subsystems are automatically selected, provided with input/output lines and enabled. In order to determine whether any of the replacement subsystems are malfunctioning, the system is retested beginning at step 340 and continues until the test is finally complete at step 342 and the desired system achieved.

It should be noted that a distinct advantage of the above method of initial testing allows the circuit to be packaged and sealed before the testing is begun.

Once the final system is achieved, whether by the first, second or third methods of testing described above, the selection circuits 299 may be utilized in the self-repair mode. In the self-repair mode, the system is capable of repair after it has been permanently packaged or sealed by blowing the fuse of a selection circuit associated with the malfunctioning subsystem to disable such malfunctioning subsystem from the common bussing system, from the input/output lines and from the bias lines and thereby isolate it from the system. The selection circuits then automatically select and enable a replacement subsystem in the same manner as the initial test mode described above with respect to FIG. 11.

MOS EMBODIMENT OF SELECTION CIRCUITS 299

Figure 12:
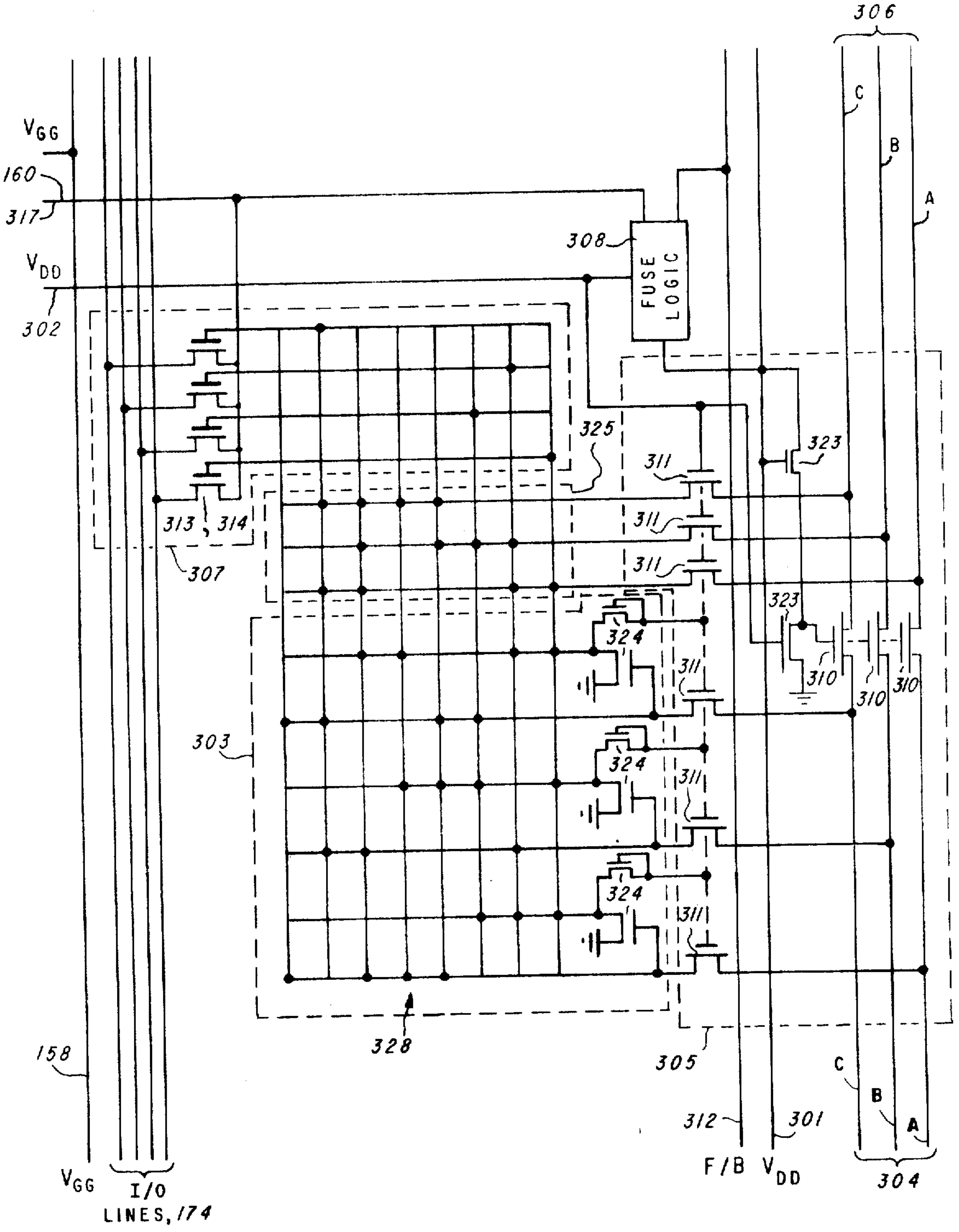
FIG. 12 is a circuit diagram illustrating an insulated-gate field effect transistor embodiment of the automatic selection circuit.
Figure 13:
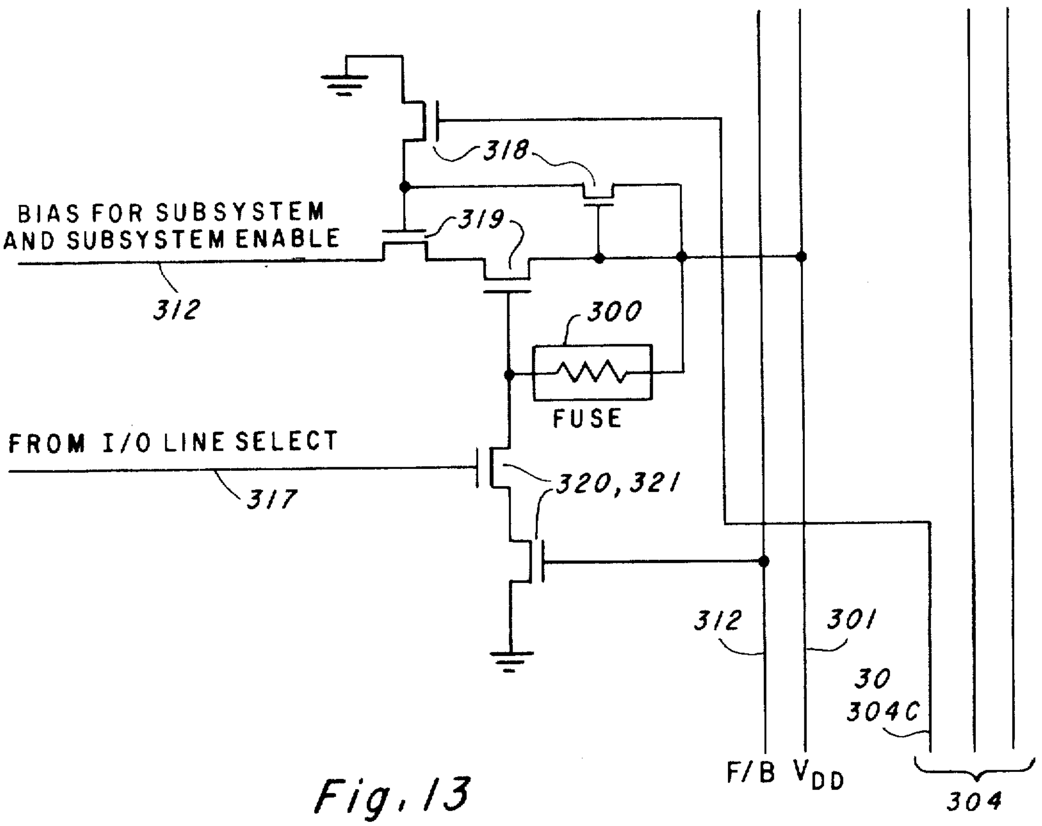
FIG. 13 is a circuit diagram illustrating an insulated-gate field effect transistor embodiment of the fuse logic circuit.

The logical structure of the selection circuits 299 has been described in detail with respect to FIGS. 1 and 2. An MOS circuit embodiment of the selection circuits is illustrated in FIG. 12. Like numbers are used to designate parts of like function. As can be seen from the circuit of FIG. 12, MOS circuit technology greatly simplifies the logical construction of the circuits. For example, since the source-drain designation of an MOS transistor is not necessarily fixed, a single MOS transistor replaces an AND-gate 313 and its associated AND-gate 314. Decoder means 303, encoder means 325 and input/output encoder means 307 are essentially comprised of a programmable logic array 328 with a decoder section comprising decoder means 303 and an encoder section comprising encoder means 325 and input/output encoder means 307. The dots on the cross lines of programmable logic array 328 represent MOS transistors with thin gate oxides and the cross lines without dots represent thick oxides between the gate and channel regions whereby no MOS transistor is formed. The programmable logic array or read only memory may be constructed according to the teaching of R. H. Crawford et al., U. S. Pat. No. 3,541,543 for BINARY DECODER assigned to assignee of the present invention. U.S. Pat. No. 3,541,543 is hereby incorporated by reference. The logical operation of the MOS selection circuit of FIG. 12 is identical to the logical operation of the logic circuit described with respect to FIG. 1. An MOS embodiment of fuse logic circuit 308 is illustrated separately in FIG. 13. Referring to FIG. 13, when binary numbers from 000 to 011 are introduced at 304 and fuse 300 is intact, a bias $V_{DD}$ is provided for the associated subsystem and the associated subsystem enable circuit at 312 by the MOS transistors comprising AND-gate 319. For binary numbers 100 to 111, the binary input at 304C is a binary one signal which turns the MOS transistor comprising NOT-gate 318 on and hence AND-gate 319 off and no bias is transmitted to the subsystem and subsystem enable circuits 312. Or, if the fuse 300 is blown, AND-gate 319 is off and no bias is provided for the subsystem and subsystem enable circuit at 312. Fuse 300 is blown by applying a signal at the input/output line coupled to the associated subsystem by the selection circuit at 317 and applying a logical one signal to fuse/blow line 312 whereby the MOS transistors comprising AND-gates 320 and 321 are turned on causing $V_{DD}$ to go to ground through fuse 300 to blow the fuse. It should be noted that I/O lines 174 are also used in the memory system to write information which is introduced by I/O lines 174 into addressed memory cells during the normal operating mode of the memory system. These input signals do not disturb the fuse 300 as long as no logic 1 signal is applied at the fuse/blow enable line 312.

MOS ENABLE CIRCUIT 141 OF THE MEMORY SYSTEM OF FIG. 8

Figure 14:
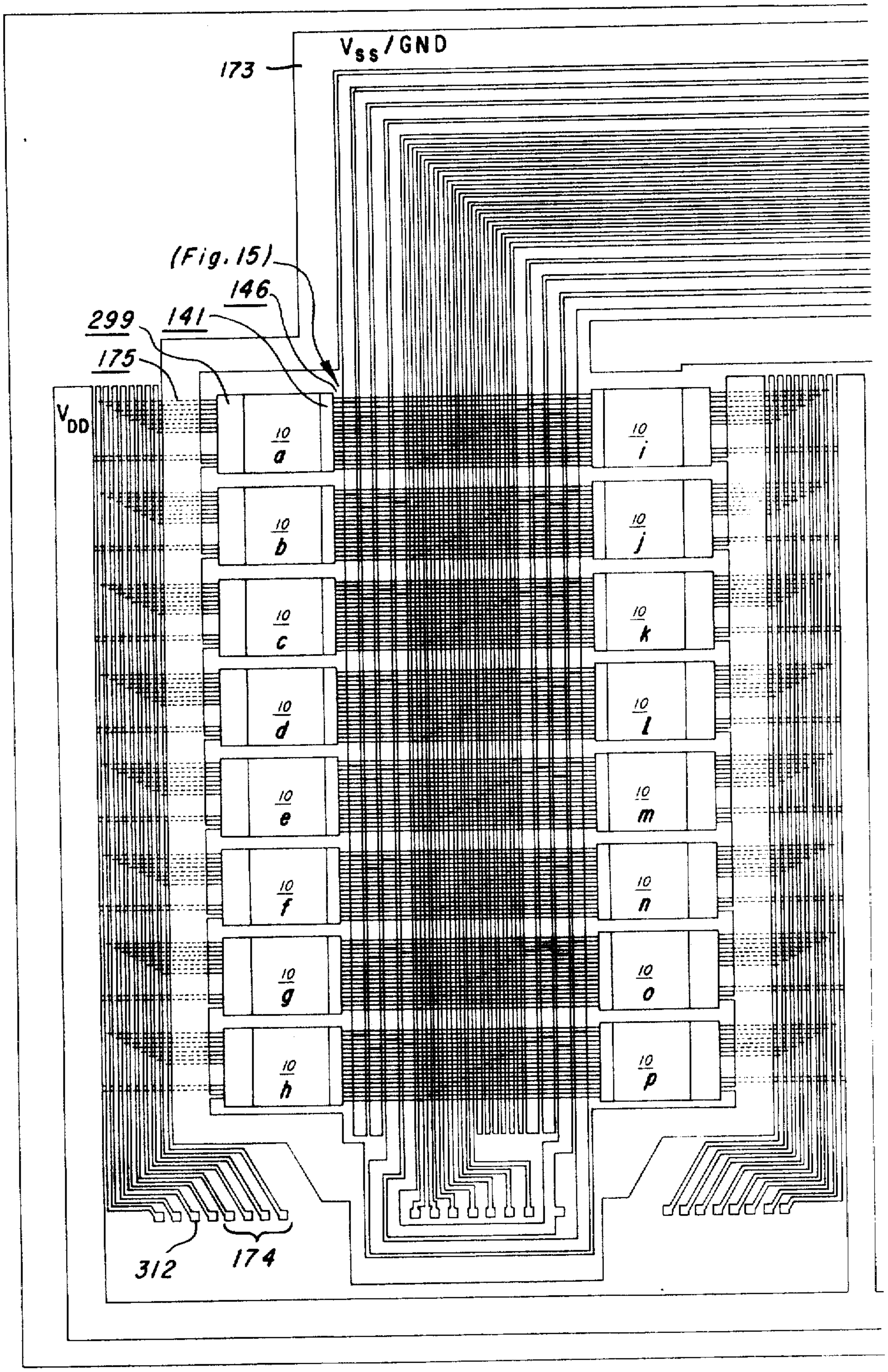
FIG. 14 is an enlarged view of half of the memory system of FIG. 8 pointing out in particular the portion of the system illustrated in FIG. 15.
Figure 15:
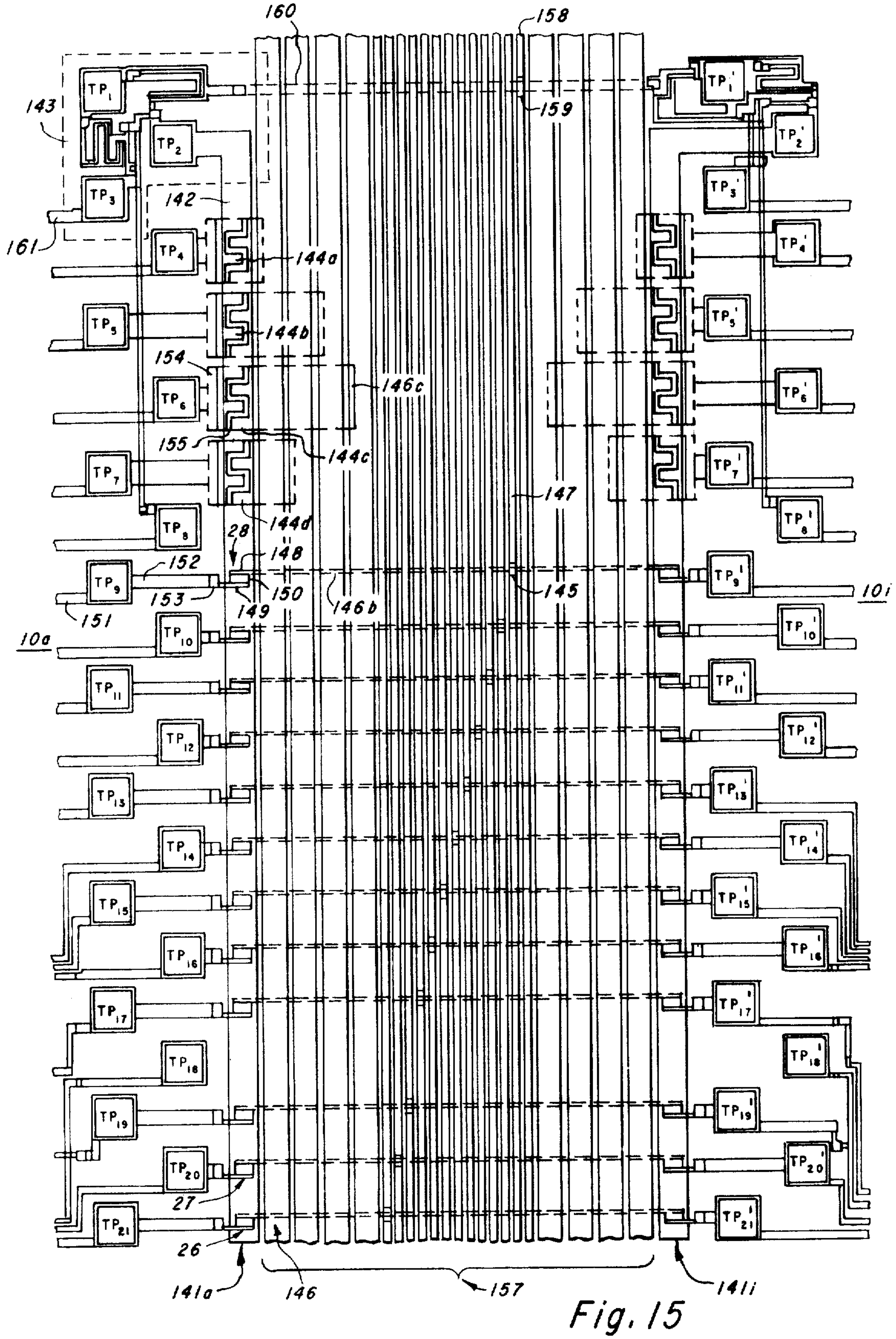
FIG. 15 is a plan view of the portion of the memory system pointed out in FIG. 14 showing the relationship between the subsystems test pads, the common bussing system and the enabling means associated with the subsystems.

FIG. 14 illustrates the left half of the memory system of FIG. 8. The subsystems 10 are labeled *a–p*. In order to better understand enable circuits 141 and their relationship to common bussing system 157 and diffused interconnects 146 of the memory system, reference is now made to FIG. 15. FIG. 15 illustrates the designated portion of FIG. 14 showing in detail test pads (utilized in conjunction with the initial test process of FIG. 9) of subsystems **10*a* and 10*i* of FIG. 14, their associated enable circuits 141*a* and 141*i*, respectively, and a portion of common bussing system 157 running between subsystems 10*a* and 10*i*. Subsystem 10*i* is the mirror image of subsystem 10*a* and hence the enable circuit sides of subsystems 10*a* and 10*i* both conveniently face common bussing system 157 for access thereto. Common bussing system 157 is comprised of a plurality of metal conductors adherently formed on an insulating oxide layer over diffused interconnects 146. The oxide layer is sufficient to prevent any interference between the electrical signals traveling along common bussing system 157 and those traveling along diffused interconnects 146**.

The various electrical signal functions necessary for operation of the subsystem circuits are provided for the subsystems by common bussing system 157. The electrical signal functions are then transmitted along high conductivity diffused interconnects 146 via the enable circuits 141 to the test pads 140 and hence to the subsystems. The only portion of the two subsystems which are shown in FIG. 15 are the test pads $TP_1$–$TP_{21}$ associated with subsystem **10*a* and $TP_1'$–$TP_{21}'$ associated with subsystem 10*i* and portions of conductors such as 151 running from the test pads into the various circuits of subsystems 10*a* and 10*i***. The electrical signal functions associated with each of the test pads $TP_1$ –$TO_{21}$ and $TP_1'$–$TP_{21}'$ are shown in TABLE 1.

Consider, for exanple, test pad $TP_9$ which requires a signal function corresponding to the row address bit $X_0$ to be transmitted to an X inverter circuit of the memory subsystem along conductor 151. Referring to common bussing system 157, conductor 147 has the $X_0$ signal function transmitted through it. Conductor 147 joins diffused interconnect **146*b* at feed through conductor 145 forming an electrically conductive path from conductor 147 to interconnect 146*b*. This is accomplished by replacing the oxide insulator between conductor 147 and interconnect 146*b* with a conductive material such as a metal at crossover point 145. Conductor 146 extends into enable circuit 141*a* and enable circuit 141*i*. Referring to enable circuit 141*a*, conductor 146*b* becomes source 148 of a field effect transistor of enable circuit 141*a*. A second diffused conductor 149 is electrically connected to metal conductor 152 at terminal 153. Test pad $TP_9$ is an expanded portion of conductors 151 and 152** which, in essence,

TABLE I

| TEST PADS | FUNCTION |
|---|---|
| $TP_1$–$TP_1'$ | $V_{GG}$ — gate voltage |
| $TP_2$–$TP_2'$ | GATE |

| | |
|---|---|
| $TP_3$–$TP_3'$ | $V_{DD}$ — operating voltage |
| $TP_4$–$TP_4'$ | $\Phi_1$ — phased clock pulses |
| $TP_5$–$TP_5'$ | $\Phi_3$ — phased clock pulses |
| $TP_6$–$TP_6'$ | $\Phi_3$ — phased clock pulses |
| $TP_7$–$TP_7'$ | $\Phi_2$ — phased clock pulses |
| $TP_8$–$TP_8'$ | $V_{SS}$(GND) |
| $TP_9$–$TP_9'$ | $X_0$ — row address |
| $TP_{10}$–$TP_{10}'$ | $X_1$ — row address |
| $TP_{11}$–$TP_{11}'$ | $X_2$ — row address |
| $TP_{12}$–$TP_{12}'$ | $X_3$ — row address |
| $TP_{13}$–$TP_{13}'$ | R/W — read-write control |
| $TP_{14}$–$TP_{14}'$ | C/S — chip-select control |
| $TP_{15}$–$TP_{15}'$ | $X_4$ — row address |
| $TP_{16}$–$TP_{16}'$ | $Y_0$ — column address |
| $TP_{17}$–$TP_{17}'$ | $Y_1$ — column address |
| $TP_{18}$–$TP_{18}'$ | I/O — input/output |
| $TP_{19}$–$TP_{19}'$ | $Y_2$ — column address |
| $TP_{20}$–$TP_{20}'$ | $Y_3$ — column address |
| $TP_{21}$–$TP_{21}'$ | $Y_4$ — column address |

is a single conductor. Conductor 148 of one conductivity type (P) by channel region 150 of opposite conductivity type (N) which region 150 is actually part of N-type substrate 11 (FIG. 8). Single gate 142 extends over all of the field effect transistors of enable circuit 141a forming P-channel enhancement mode MOS switches. Between channel region 150 and gate 142 is a relatively thin oxide layer. When gate 142 is biased with negative gate voltage $V_{GG}$, all of the field effect transistors of enable circuit **141*a* are turned on allowing the signal functions transmitted through the conductors of common bussing system 157 to be transmitted to subsystem 10*a*. Thus, the signal function $X_0$ transmitted along conductor 147 of common bussing system 157 is transmitted along conductor 146*b* through biased enable circuit 141*a*, along conductor 149, along conductor 152, and finally along conductor 151 to the X inverter circuit of subsystem 10*a*. The signal functions associated with test pads TP4–TP7 are clock generator voltage pulse signals of clock phases $\phi_1$–$\phi_4$. More current is required of the clock pulse signals than the address signals, for example, and therefore larger field effect transistors 144*a*–144*d* are required for transmission of the clock pulse signals to subsystem 10*a*. Referring to field effect transistor 144*c*, for example, a large diffused conductor 146*c* becomes the source of the transistor and another large diffused conductor 154 becomes the drain of the transistor. A serpentine shaped spaced region of opposite conductivity type (N) 155 between conductor 154 and conductor 156 becomes the channel region over which is formed a relatively thin adherent oxide insulator material so that gate 142 will turn on field effect transistor 144*c***.

Figure 16:
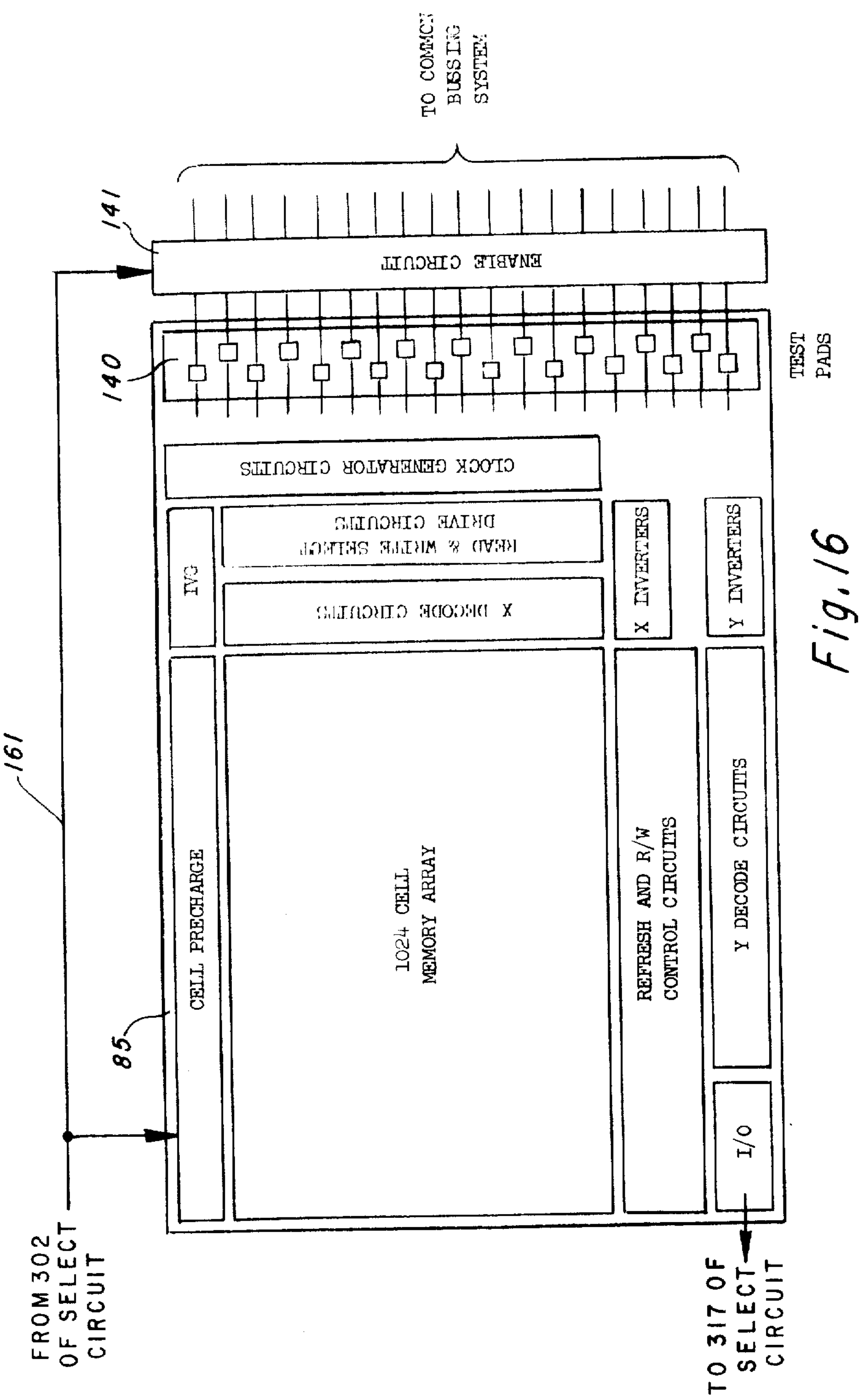
FIG. 16 is a plan view of a subsystem of the memory system showing the physical placement of the various subsystem circuits in accordance with one embodiment of the invention.

In addition, it should be noted that the automatic grounding circuit 143 described previously with respect to FIG. 5 is utilized in conjunction with enable circuits 141 of the field effect transistor random access memory system. Again referring to enable circuit **141*a*, its associated automatic grounding system is designated by the numeral 143. In this embodiment, gate voltage $V_{GG}$ is transmitted along conductor 158 of common bussing system 157. Voltage $V_{GG}$ is then transmitted to automatic grounding circuit 143 through diffused conductor 160 via feed through conductor 159. Voltage $V_{DD}$, which is utilized to switch automatic grounding circuit 143 from the ground position to a position whereby voltage $V_{GG}$ is transmitted to gate 142, is transmitted to circuit 143 by conductor 161 which in turn is connected to the $V_{DD}$ bias provided by subsystem 10*a*'s associated selection circuit at 302. Referring to FIG. 16, conductor 161 which also supplies operating voltage $V_{DD}$ to the circuits of subsystem 10*a* extends through subsystem 10*a* to the subsystem bias provided at 302 of its associated selection circuit 299*a*. Supply voltage $V_{DD}$ is transmitted to all of the subsystems through metal conductor 301 (FIGS. 8 and 14). Supply voltage $V_{DD}$ is transmitted to the subsystem and to automatic grounding circuit 143 by its associated selection circuit 299 completing an electrically conductive path between conductors 301 and 302; and, hence 161 to which 302 is connected. Also shown in FIGS. 8 and 14 is the $V_{SS}$ conductor 173 which is utilized as ground for the various subsystems. In some instances, improved operation of the insulated gate field effect memory subsystems 10 is achieved by connecting $V_{SS}$ conductor 173** to a slightly positive voltage rather than the zero voltage for ground.

MEMORY SUBSYSTEMS

Figure 17:
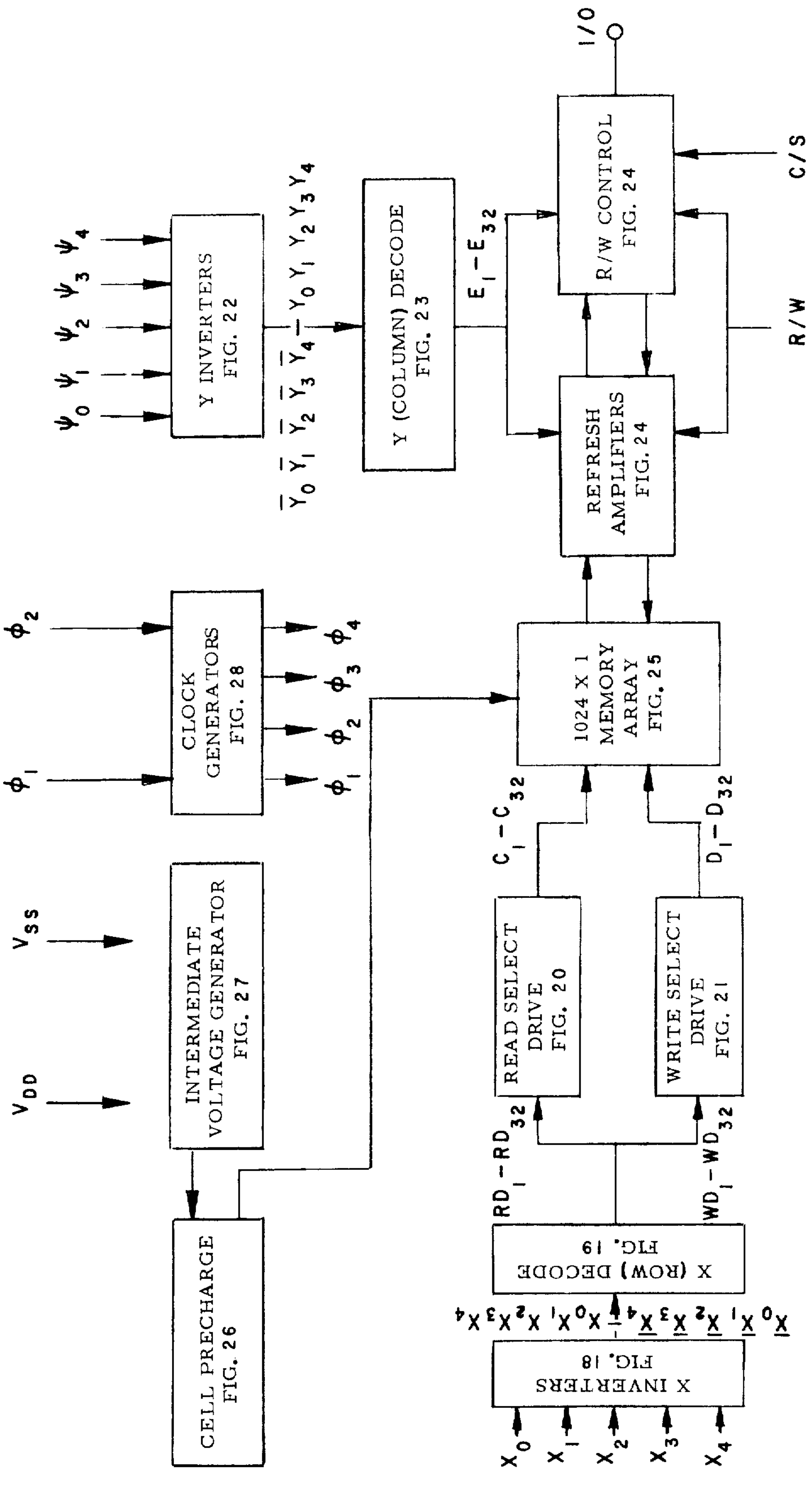
FIG. 17 is a map diagram illustrating the various circuits of each memory subsystem and the interrelationship of the subsystem circuits.
Figure 26:
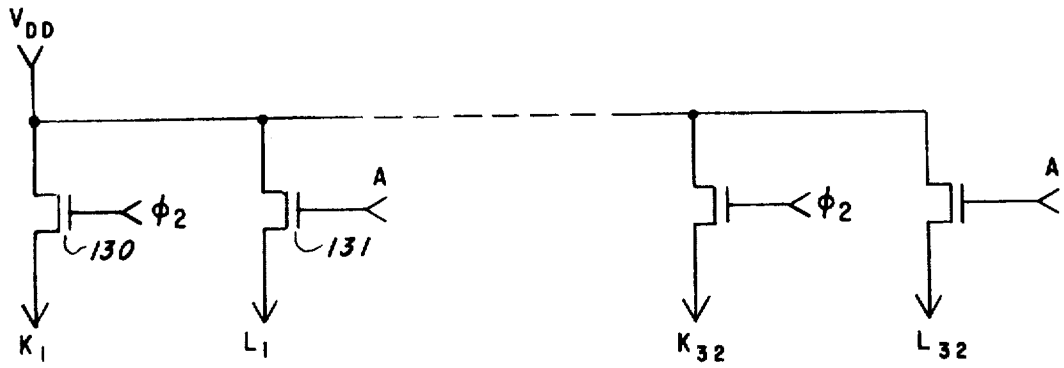
FIG. 26 is a circuit diagram of the memory cell precharge circuits.
Figure 27:
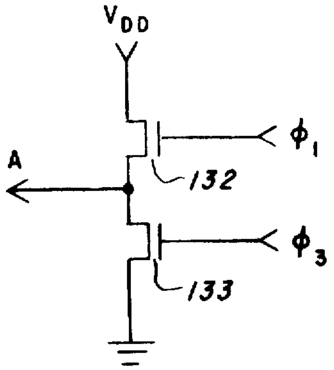
FIG. 27 is the circuit diagram of the intermediate voltage generators of the memory system.

Each of the thirty-two subsystems 10 is a complex system in itself, as illustrated in FIGS. 15 and 17. FIG. 16 illustrates the physical layout of the subsystem while FIG. 17 shows the relationship of subsystem circuits. The subsystems each include a 1,024 bit memory array (FIG. 25), X inverter circuits (FIG. 18), Y inverter circuits (FIG. 220, X or row decode circuits (FIG. 19), Y or column decode circuits (FIG. 23), read select drive amplifiers (FIG. 20), write select drive amplifiers (FIG. 21), refresh amplifiers and read/write control circuits (FIG. 24), cell precharge circuits (FIG. 26), clock generator circuits (FIGS. **28*a*–28*c*), and an intermediate voltage generator (FIG. 27). The subsystem circuits are interconnected according to the map shown in FIG. 17**.

Row addresses $X_0X_1X_2X_3X_4$ are indicated into the X inverter circuits which provide both the original row address bits $X_0$–$X_4$ and the complements of the original row address bits $\overline{X}_0$–$\overline{X}_4$. The five X inversion circuits comprising the row inverter, illustrated in FIG. 18, each have an input terminal for the application of a signal corresponding to one bit of the row address $X_0$–$X_4$. The input terminals $X_0$–$X_4$ are respectively connected to the sources of insulated gate field effect transistors **86*a*–86*e*, which act as gates for the applied input signal address when a pulse from clock phase $\phi_1$ is applied to the gates of transistors 86*a*–86*e*. The drains of transistors 86*a*–86*e* are connected to the gates of transistors 87*a*–87*e*, respectively, from which the complementary outputs are generated. The sources of transistors 87*a*–87*e* are connected to ground and the drains coupled to voltage supply $V_{DD}$ through resistances respectively provided by gate-shorted-to-drain field effect transistors 88*a*–88*e*. The drains of transistors 87*a*–87*e* also provide the complementary outputs $\overline{X}_0$–$\overline{X}_4$, respectively. In addition, the drain terminals of transistors 89*a*–89*e* are connected to the drain terminals of transistors 86*a*–86*e*, respectively, and the sources of transistors 89*a*–89*e* are connected to ground. When a pulse from clock phase $\phi_1$ is applied to the gates of transistors 86*a*–86*e*, the uncomplemented X address bits $X_0$–$X_4$ are also transmitted from the drain terminals of transistors 86*a*–86*e*** discharge the inverter circuits during a pulse from clock phase $\phi_3$. Thus, when the X or row address $X_0X_1X_2X_3X_4$is applied to the row inverter circuits, the X address $X_0X_1X_2X_3X_4$ and is complemented $\overline{X}_0\overline{X}_1\overline{X}_2\overline{X}_3\overline{X}_4$ are generated during desired clock pulses.

Figure 19:
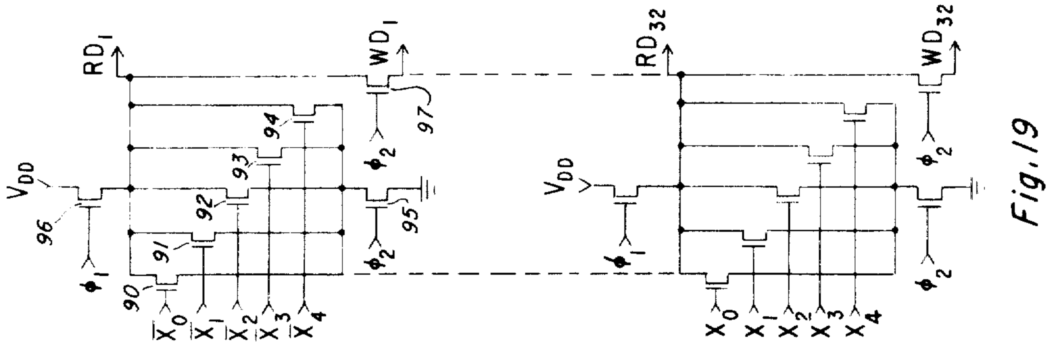
FIG. 19 is a circuit diagram of the X (row) decode memory circuits.
Figure 25:
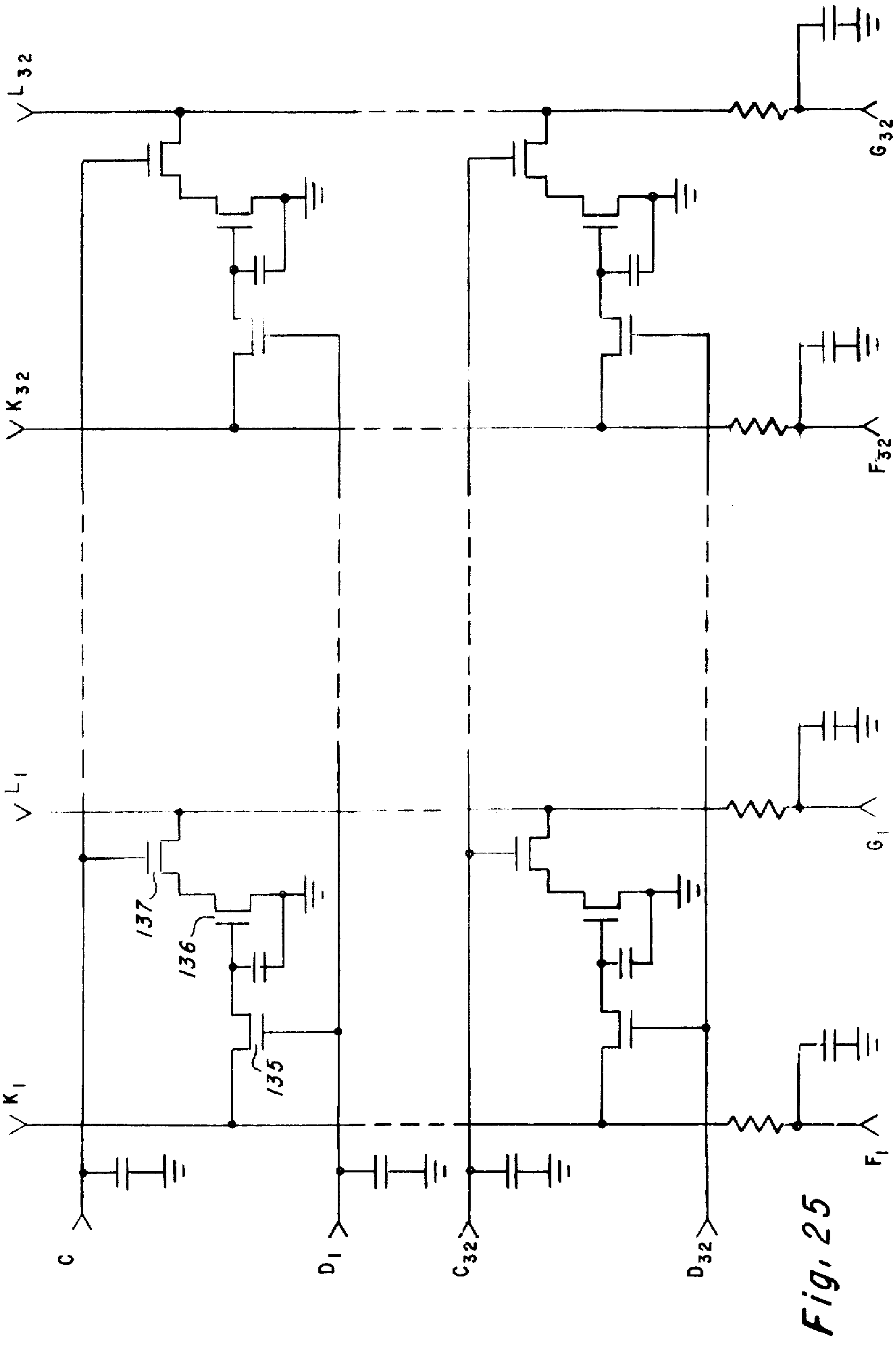
FIG. 25 is a circuit diagram of the 1,024 cell memory arrays.

The 1.024 bit memory array which will be discussed in detail with respect to FIG. 25 is arranged in rows and columns of 32. There are therefore 32 row decode circuits, one such decode circuit for each row of the memory array. Two of the row inverter circuits only (the first and 32 ) are shown in FIG. 19, with a dashed line representing the remaining 30 decode circuits. Each decode circuit has five inputs. The first input is connected to either the $X_0$ or $\bar{X}_0$ inverter output; the second input is connected to the $X_1$ or $\bar{X}_1$ inverter output; the third input is connected to the $X_2$ or $\bar{X}_2$ inverter output; the fourth input is connected to the $X_3$ or $\bar{X}_3$ inverter output; and the fifth input is connected to the $X_4$ or $\bar{X}_4$ inverter output, thereby achieving the addressing of a single row for any five bit X or row address. The row addressing inputs and inverter output connections to the row decode circuit of FIG. 19 are shown in TABLE II.

Thus, according to TABLE II, the input terminals of the first X or row decoe circuit illustrated in FIG. 19 are connected to inverter terminals $\bar{X}_0\bar{X}_1\bar{X}_2\bar{X}_3\bar{X}_4$ as shown, and the 32 X or row decode circuit is connected to inverter terminals $X_0X_1X_2X_3X_4$. Row 1 is then addressed when the binary address is 00000 and the 32 row is addressed when the binary address is 11111. The addressing of intermediate rows in accordance with row decode circuit connections is as shown in TABLE II.

The X decode and circuits operate as follows: to the five input terminals of each of the 32 X or row decode circuits is applied its respective X address corresponding to the address introduced into the X inverter circuits according to the TABLE II connections. This address corresponds to only on of the row decode circuit connections and therefore

TABLE II

| ROW | BINARY ADDRESS | ROW DECODE CIRCUIT CONNECTIONS |
|---|---|---|
| 1 | 00000 | $\bar{X}_4\bar{X}_3\bar{X}_2\bar{X}_1\bar{X}_0$ |
| 2 | 00001 | $\bar{X}_4\bar{X}_3\bar{X}_2\bar{X}_1X_0$ |
| 3 | 00010 | $\bar{X}_4\bar{X}_3\bar{X}_2X_1\bar{X}_0$ |
| 4 | 00011 | $\bar{X}_4\bar{X}_3\bar{X}_2X_1X_0$ |
| 5 | 00100 | $\bar{X}_4\bar{X}_3X_2\bar{X}_1\bar{X}_0$ |
| 6 | 00101 | $\bar{X}_4\bar{X}_3X_2\bar{X}_1X_0$ |
| 7 | 00110 | $\bar{X}_4\bar{X}_3X_2X_1\bar{X}_0$ |
| 8 | 00111 | $\bar{X}_4\bar{X}_3X_2X_1X_0$ |
| 9 | 01000 | $\bar{X}_4X_3\bar{X}_2\bar{X}_1\bar{X}_0$ |
| 10 | 01001 | $\bar{X}_4X_3\bar{X}_2\bar{X}_1X_0$ |
| 11 | 01010 | $\bar{X}_4X_3\bar{X}_2X_1\bar{X}_0$ |
| 12 | 01011 | $\bar{X}_4X_3\bar{X}_2X_1X_0$ |
| 13 | 01100 | $\bar{X}_4X_3X_2\bar{X}_1\bar{X}_0$ |
| 14 | 01101 | $\bar{X}_4X_3X_2\bar{X}_1X_0$ |
| 15 | 01110 | $\bar{X}_4X_3X_2X_1\bar{X}_0$ |
| 16 | 01111 | $\bar{X}_4X_3X_2X_1X_0$ |
| 17 | 10000 | $X_4\bar{X}_3\bar{X}_2\bar{X}_1\bar{X}_0$ |
| 18 | 10001 | $X_4\bar{X}_3\bar{X}_2\bar{X}_1X_0$ |
| 19 | 10010 | $X_4\bar{X}_3\bar{X}_2X_1\bar{X}_0$ |
| 20 | 10011 | $X_4\bar{X}_3\bar{X}_2X_1X_0$ |
| 21 | 10100 | $X_4\bar{X}_3X_2\bar{X}_1\bar{X}_0$ |
| 22 | 10101 | $X_4\bar{X}_3X_2\bar{X}_1X_0$ |
| 23 | 10110 | $X_4\bar{X}_3X_2X_1\bar{X}_0$ |
| 24 | 10111 | $X_4\bar{X}_3X_2X_1X_0$ |
| 25 | 11000 | $X_4X_3\bar{X}_2\bar{X}_1\bar{X}_0$ |
| 26 | 11001 | $X_4X_3\bar{X}_2\bar{X}_1X_0$ |
| 27 | 11010 | $X_4X_3\bar{X}_2X_1\bar{X}_0$ |
| 28 | 11011 | $X_4X_3\bar{X}_2X_1X_0$ |
| 29 | 11100 | $X_4X_3X_2\bar{X}_1\bar{X}_0$ |
| 30 | 11101 | $X_4X_3X_2\bar{X}_1X_0$ |
| 31 | 11110 | $X_4X_3X_2X_1\bar{X}_0$ |
| 32 | 11111 | $X_4X_3X_2X_1X_0$ |

to one row of the memory array. Referring to the first row decode circuit, the five bits of the row address are applied to respective gates of one of five insulated gate field effect transistors 90–94 connected in parallel. The commonly connected sources of transistors 90–94 are connected to the drain of insulated gate field effect transistor 95. The gate of transistor 95 is connected to clock phase $\phi_2$ and the source of transistor 95 is connected to ground. The commonly connected drains of transistors 90–94 are connected to the source of still another field effect transistor 96. The gate of transistor 96 is connected to clock phase $\phi_1$ and the drain of transistor 96 is connected to supply voltage $V_{DD}$. In this arrangement, when pulses from phased clock $\phi_1$ are applied to the gate of field effect transistor 96, for each of the 32 X decode circuits, that decode circuit which has all binary ones applied to the gate of the five parallel field effect transistors 90–93 will be provided a binary 0 output at its RD and at WD terminal at clock phase $\phi_2$. Transistor 95 discharges transistors 90–94 during a pulse from clock phase $\phi_2$. Transistor 97 is a coupling or control device utilized to coordinate the phasing of read select signals and write select signals.

Figure 20:
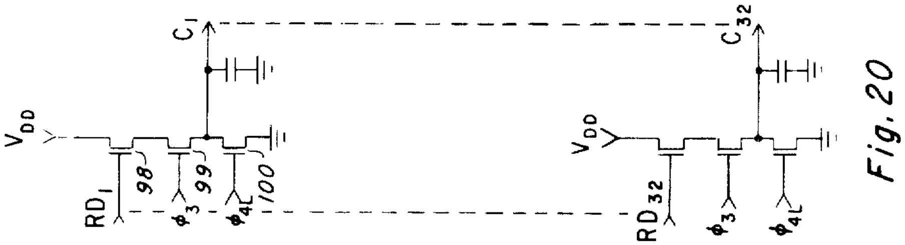
FIG. 20 is a circuit diagram of the read-select drive memory circuits.

The RD outputs from the 32 X decode circuits RD $_{1\ RD\ 32}$ are each transmitted to one of 32 identical read select drive circuits illustrated in FIG. 20. On the first and 32 read select drive circuits are shown in FIG. 20, th remaining circuits being represented by a dashed line. Referring to the first read select drive circuit, the circuit is comprised of three field effect transistors 98–100 connected in series. The drain of transistor 98 is connected to supply voltage $V_{DD}$ and the source of transistor 100 is connected to ground. The read select drive output RD $_1$ operates the gate of transistor 98. The gate of transistor 99 is operated by pulses from clock phase $\phi_3$ which charges the drive circuit to transmit a signal and the gate of transistor 100 is operated by a low level pulse from clock phase $\phi_{4L}$ which discharges the drive circuit to stop the signal transmission. When the $RD_1$ input is equivalent to a binary 0 a clocked binary 0 is transmitted from the $C_1$ output of the first read select drive circuit during clock phase $\phi_3$. The remaining 32 read select drive circuits operate in an identical manner and, since only one row of the memory array is addressed at one time, there will be only one Rd input equivalent to a binary 0 at any one time and hecne only one of the C outpus, $C_1$–$C_{32}$, will have a binary 0 output.

Figure 18:
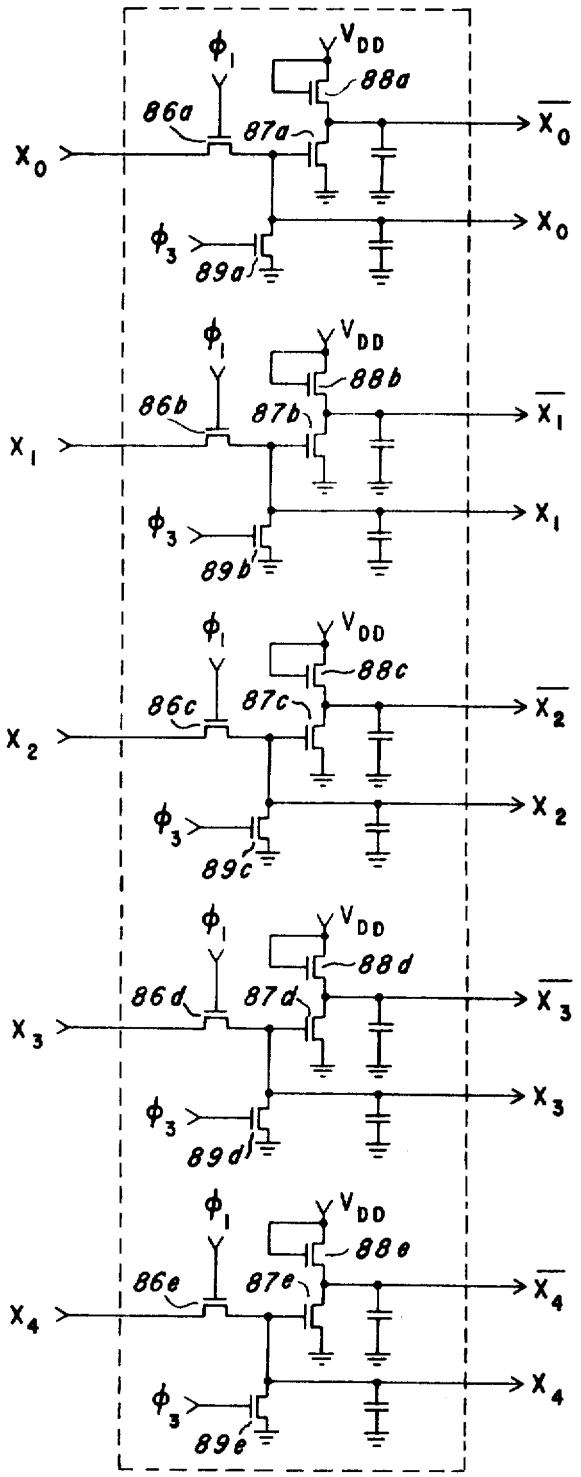
FIG. 18 is a circuit diagram of the X address inverter memory circuits.
Figure 21:
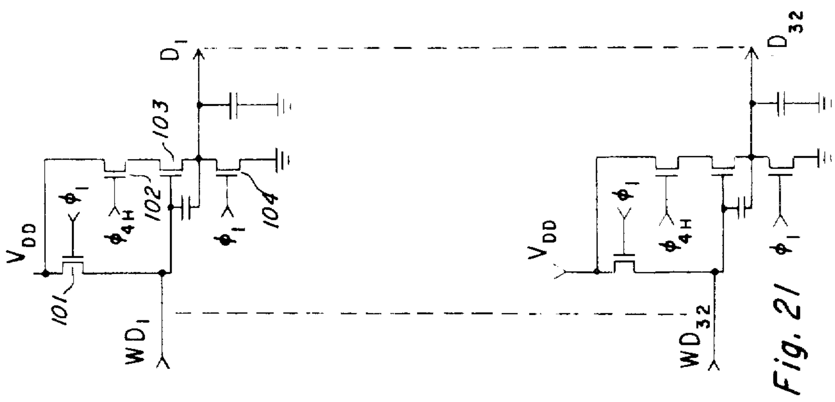
FIG. 21 is a circuit diagram of the write-select memory circuits.
Figure 22:
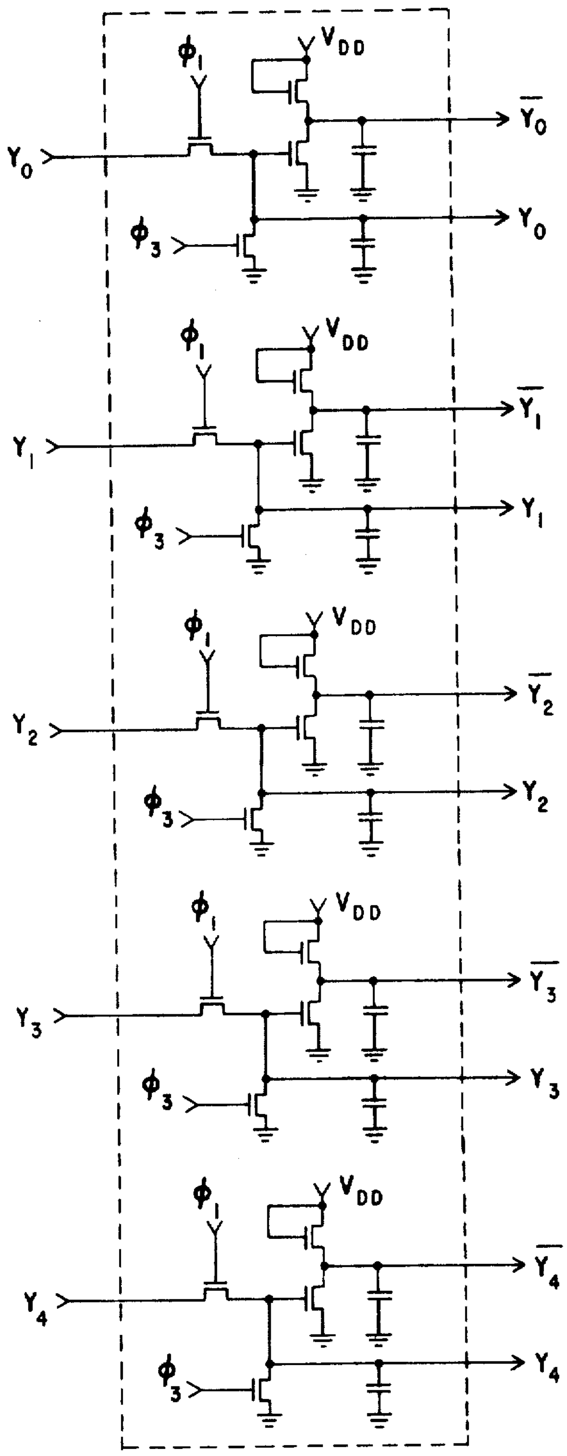
FIG. 22 is a circuit diagram of the Y address inverter memory circuits.

The 32 WD outputs from the X decode circuits $WD_1$–$WE_{32}$ are each connected to one of 32 write select drive circuits illustrated ins FIG. 21. there are 32 identical write select drive circuits, one per row, of which only the first and 32 are shown; the remaining write select drive circuits are represented by a dashed line. Referring to the first write select drive circuit in FIG. 21, the circuit is comprised of three field effect transistors 102–104 connected in series with the drain of transistor 102 connected to supply voltage $V_{DD}$ and the source of transistor 104 connected to ground. When X decode output $WE_1$ is equal to a binary 0, the gate of transistor 103 is turned on. A pulse from high level clock phase $\phi_{4H}$ operates the gate of field effect transistor 102 which charges the drive circuit to transmit a signal and a high level pulse from clock phase $\phi_1$ operates the gate of transistor 104 which discharges the drive circuits to stop the signal transmission. Transistor 101 is utilized to precharge the drive circuit during a pulse from clock phase $\phi_1$. When input $WD_1$ is equivalent to a binary 0, a clocked binary 0 output appears at write select drive output $D_1$ during a pulse from clock phase $\phi_4$. the remaining 32 write select drive circuits operate in an identical manner. Since only one of the WE inputs, WD $_1$–$WD_{32}$, is equivalent to a binary 0 for any address presented to he 32 X decode circuits, only one of the write select drive outputs, $D_1$–$D_{32}$, is equivalent to a binary 0 for any given address. The Y inverter circuits, illustrated in FIG. 22, operate in a manner identical to those of the X inverter circuits (FIG. 18). Column addresses $Y_0Y_1Y_2Y_3Y_4$ are introduced into the Y inverter circuits which provide both the original column address bits $\overline{Y}_0\overline{Y}_4$. The five inversion circuits comprising the column inverter each have an input terminal for the application of a signal corresponding to one bit of the column address $Y_0$–$Y_4$. Thus, when the Y or column address is applied to the column inverter circuits, the Y address $Y_0Y_1Y_2Y_3Y_4$ and its complements $\overline{Y}_0\overline{Y}_1\overline{Y}_2\overline{Y}_3\overline{Y}_4$ are generated during desired clock pulses.

Figure 23:
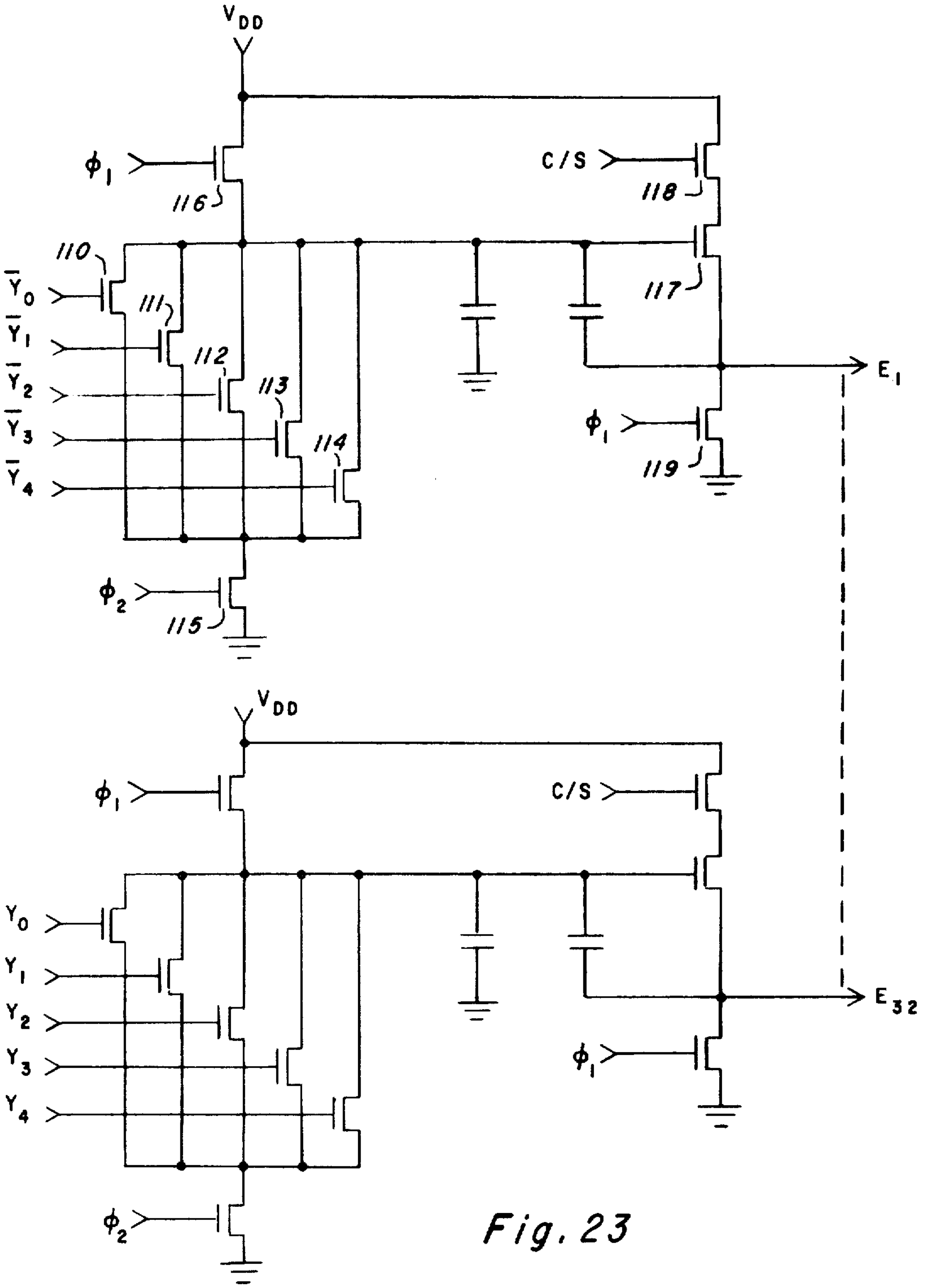
FIG. 23 is a circuit diagram of the Y (column) decode memory circuits.

Again, the 1.024 bit memory array, which will be discussed in detail with respect to FIG. 25, is arranged in rows and columns of 32. There are therefore 32 column decode circuits, one such decode circuit for each column of the memory array. Two of the column decode circuits only (the first and 32) are shown in FIG. 23, with a dashed line representing the remaining 30 decode circuits. Similar to the X decode circuits (FIG. 19) the Y decode circuits have five inputs provided by the gates of five parallel connected field effect transistors 110–114. The first input is connected to either the $Y_0$ or $\overline{Y}_0$ inverter output; the second input is connected to the $Y_1$ or $\overline{Y}_1$ inverter output; the third input is connected to the $Y_2$ or $\overline{Y}_2$ inverter output; the fourth input is connected to the $Y_3$ or $\overline{Y}_3$ inverter output; and the fifth input is connected to the $Y_4$ or $\overline{Y}_4$ inverter output, thereby achieving the addressing of a single column for any five bit Y or column address. The column addressing and column decode circuit connections are shown in TABLE III.

According to TABLE III, the input terminals of the first Y or column decode circuit illustrated in FIG. 23 are connected to $\overline{Y}_0\overline{Y}_1\overline{Y}_2\overline{Y}_3\overline{Y}_4$ and the 32 Y or column decode circuit is connected to $Y_0Y_1Y_2Y_3Y_4$. In this arrangement, the binary address 00000 applied to the Y address inputs of the Y inverter circuits (FIG. 23) addresses column 1 of the memory array and the binary address 11111

TABLE III

| COLUMN | BINARY ADDRESS | COLUMN DECODE CIRCUIT CONNECTIONS |
|---|---|---|
| 1 | 00000 | $\overline{Y}_4\overline{Y}_3\overline{Y}_2\overline{Y}_1\overline{Y}_0$ |
| 2 | 00001 | $\overline{Y}_4\overline{Y}_3\overline{Y}_2\overline{Y}_1Y_0$ |
| 3 | 00010 | $\overline{Y}_4\overline{Y}_3\overline{Y}_2Y_1\overline{Y}_0$ |
| 4 | 00011 | $\overline{Y}_4\overline{Y}_3\overline{Y}_2Y_1Y_0$ |
| 5 | 00100 | $\overline{Y}_4\overline{Y}_3Y_2\overline{Y}_1\overline{Y}_0$ |
| 6 | 00101 | $\overline{Y}_4\overline{Y}_3Y_2\overline{Y}_1Y_0$ |
| 7 | 00110 | $\overline{Y}_4\overline{Y}_3Y_2Y_1\overline{Y}_0$ |
| 8 | 00111 | $\overline{Y}_4\overline{Y}_3Y_2Y_1Y_0$ |
| 9 | 01000 | $\overline{Y}_4Y_3\overline{Y}_2\overline{Y}_1\overline{Y}_0$ |
| 10 | 01001 | $\overline{Y}_4Y_3\overline{Y}_2\overline{Y}_1Y_0$ |
| 11 | 01010 | $\overline{Y}_4Y_3\overline{Y}_2Y_1\overline{Y}_0$ |
| 12 | 01011 | $\overline{Y}_4Y_3\overline{Y}_2Y_1Y_0$ |
| 13 | 01100 | $\overline{Y}_4Y_3Y_2\overline{Y}_1\overline{Y}_0$ |
| 14 | 01101 | $\overline{Y}_4Y_3Y_2\overline{Y}_1Y_0$ |
| 15 | 01110 | $\overline{Y}_4Y_3Y_2Y_1\overline{Y}_0$ |
| 16 | 01111 | $\overline{Y}_4Y_3Y_2Y_1Y_0$ |
| 17 | 10000 | $Y_4\overline{Y}_3\overline{Y}_2\overline{Y}_1\overline{Y}_0$ |
| 18 | 10001 | $Y_4\overline{Y}_3\overline{Y}_2\overline{Y}_1Y_0$ |
| 19 | 10010 | $Y_4\overline{Y}_3\overline{Y}_2Y_1\overline{Y}_0$ |
| 20 | 10011 | $Y_4\overline{Y}_3\overline{Y}_2Y_1Y_0$ |
| 21 | 10100 | $Y_4\overline{Y}_3Y_2\overline{Y}_1\overline{Y}_0$ |
| 22 | 10101 | $Y_4\overline{Y}_3Y_2\overline{Y}_1Y_0$ |
| 23 | 10110 | $Y_4\overline{Y}_3Y_2Y_1\overline{Y}_0$ |
| 24 | 10111 | $Y_4\overline{Y}_3Y_2Y_1Y_0$ |
| 25 | 11000 | $Y_4Y_3\overline{Y}_2\overline{Y}_1\overline{Y}_0$ |
| 26 | 11001 | $Y_4Y_3\overline{Y}_2\overline{Y}_1Y_0$ |
| 27 | 11010 | $Y_4Y_3\overline{Y}_2Y_1\overline{Y}_0$ |
| 28 | 11011 | $Y_4Y_3\overline{Y}_2Y_1Y_0$ |
| 29 | 11100 | $Y_4Y_3Y_2\overline{Y}_1\overline{Y}_0$ |
| 30 | 11101 | $Y_4Y_3Y_2\overline{Y}_1Y_0$ |
| 31 | 11110 | $Y_4Y_3Y_2Y_1\overline{Y}_0$ |
| 32 | 11111 | $Y_4Y_3Y_2Y_1Y_0$ |

addresses column 32 of the memory array. The addressing of intermediate columns in accordance with column decode circuit connection is shown in TABLE III.

The sources of the parallel connected field effect transistors 110-114 are commonly connected to the drain of transistor 115 and the drains of transistors 110–114 are commonly connected to the source of transistor 116. The drain of transistor 116 is connected to voltage supply $V_{DD}$ and the source of transistor 115 is connected to ground. A pulse from clock phase $\phi_1$ operates the gate of transistor 116 which charges the decode circuit for transmission of an output signal whereby a binary 0 output is applied to the gate of transistor 117 when the gate inputs of transistors 110–114 are all equivalent to binary 1's. Thus, when the Y address is 00000, the first Y decode circuit having the input $\overline{Y}_0\overline{Y}_1\overline{Y}_2\overline{Y}_3\overline{Y}_4$(11111) will address the first column of the 1,024 bit memory array during clock phase $\phi_2$. Transistor 117 is turned on by a binary 0 decode output. A signal is not transmitted to output $E_1$, however, unless transistor 118 is turned on. The drain of transistor 118 is connected to supply voltage $V_{DD}$ and the source of transistor 119 is connected to ground. A binary 0 chip select signal (C/S) turns on the gate of transistor 118 to provide a binary 0 output $E_1$ for selecting column 1. The output signal is cut off by a pulse from clock pulse $\phi_1$ applied to the gate of transistor 119. The thirty-two Y decode circuits therefore provide outputs $E_1$–$E_{32}$, each output corresponding to one of the columns of the 1,024 bit memory array in accordance with TABLE III.

Figure 24:
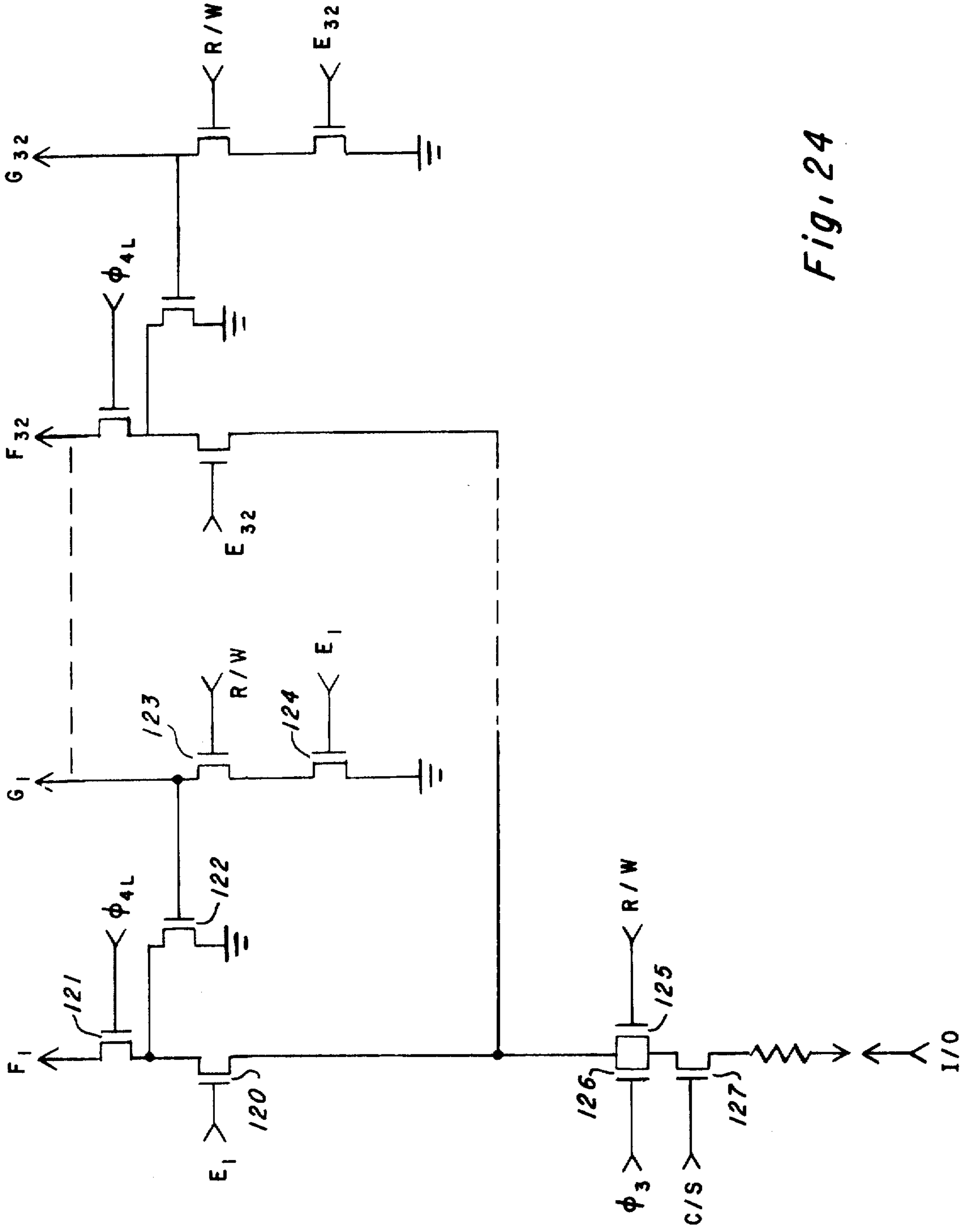
FIG. 24 is a circuit diagram of a memory refresh amplifier and the read/write control circuits.

The read-write control circuits and refresh amplifiers, of which there are 32, one per column, are illustrated in FIG. 24. Only the first and 32 of such circuits are shown in FIG. 24, the remaining circuits being represented by a dashed line. Also illustrated is an input/output circuit to which all of the read-write control circuits and refresh amplifiers are commonly connected. Referring to the common input/output circuits, inputs are transmitted to and outputs transmitted from the I/O terminal. The gate of transistor 127 is operated by a chip select signal (C/S) whereby one of several random access memory systems connected in parallel is selected. For example, if as few as 500 of the above described exemplary embodiment of the random access memory system semiconductor substrates of the invention are connected so that all of the input and output connections aside from the chip select are connected in parallel, the chip select lines representing Z addressing, a total random access memory capacity of 8,704,000 bits is achieved. This includes the storage of 512,000 words of 16 bits each plus 1 parity bit word. The 500 interconnected wafers represent an approximate physical space of 2,250 cubic inches or less than 1-⅓ cubic foot.

Referring to the first of such circuits, the gates of transistors 123 and 125 are operated by a read-write control signal. When the control signal is a binary 0, the I/O signal is written into the addressed cell while, when the read/write signal is a binary 1, the information stored in the address cell is outputted at the I/O terminal. The output of the first Y decode circuit $E_1$ is applied to control the gates of transistors 120 and 124 whereby the proper column of the memory array is addressed. The input/output circuit is operated by pulses from clock phase $\phi_3$ at the gate of transistor 126 for reading and the read/write-refresh circuit is operated by pulses from clock phase $\phi_{4L}$ for writing and refresh cycling. The remaining read/write-refresh amplifier circuits operate in an identical manner. Information is written into a cell from one of output terminals $F_1$–$F_{32}$ and information is read out of a cell from one of terminals $G_1$–$G_{32}$. The information read out of a cell in the first column at terminal $G_1$ is transmitted to the I/O via field effect transistor 122 with transistor 121 in the off mode blocking transmission of signals to terminal line $F_1$ and via transistors 120, 126 and 127. The information written into a cell in the first column at terminal $F_1$ is transmitted from the I/O terminal via transistors 127, 125, 120 and 121 with transistor 122 in the off mode blocking transmission of signals to terminal line $G_1$.

The cell precharge circuit for the memory array is utilized to achieve a higher voltage level in the cell. There are 32 precharge circuits, one per column, as illustrated in FIG. 26. Only the first and 32 cell precharge circuits are illustrated in FIG. 26, the remaining circuits which are identical to those shown being represented by a dashed $V_{DD}$ conductor line. Referring to the first cell precharge circuit, the circuit is comprised of a pair of field effect transistors 130 and 131. The drains of the transistors are both connected to supply voltage $V_{DD}$. Transistor 130, operated by a voltage pulse from clock phase $\phi_2$, is utilized to precharge the cell for information to be written into such cell and supplies an output at its source terminal $K_1$. Transistor 131 is operated by an intermediate voltage generated by an intermediate voltage generator (FIG. 27), and is utilized to precharge the memory cell when information is to be read out of such cell. The output of transistor 131 is at its source terminal $L_1$. The 32 cell precharge circuits therefore provide outputs $K_1$–$K_{32}$ and outputs $L_1$–$L_{32}$.

The intermediate voltage required by the cell precharge circuits at terminal A is provided by a single intermediate voltage generator circuit (IVG) illustrated in FIG. 27. The intermediate voltage generator is comprised of two field effect transistors 132 and 133 connected in series with the drain of transistor 132 connected to voltage supply $V_{DD}$ and the source of transistor 133 connected to ground. The gate of transistor 132 is operated by pulses from clock phase $\phi_1$ and the gate of transistor 133 is operated by pulses from clock phase $\phi_3$, whereby a clocked voltage output is provided at terminal A for the cell precharge circuits (FIG. 26).

At this point, there are 128 input and output lines to be connected to the 1,024 cell memory array. As shown in FIG. 17, there are 32 input conductor lines from the write select drive circuits (FIG. 21), $D_1$–$D_{32}$, 32 input conductor lines from the read select drive circuits (FIG. 20), $C_1$–$C_{32}$, 64 input conductor lines from the cell precharge circuits (FIG. 26), $K_1$–$K_{32}$ and $L_1$–$L_{32}$32 input conductor lines from the read-write control circuits and refresh amplifiers (FIG. 24), $F_1$–$F_{32}$, and 32 output conductor lines from the read-write control circuits and refresh amplifiers $G_1$–$G_{32}$. The 1,024 cell memory array for storage of 1,024 bits of binary information is illustrated in FIG. 25. The cells are arranged in rows and columns of 32 so that there are 32 columns having 32 cells in each column or 32 rows having 32 cells in each row. Only the four outermost corner cells are illustrated in FIG. 25; the remaining cells are represented by the dashed lines. Referring to the first cell in the upper left-hand corner of the array, each cell is comprised of three field effect transistors, 135–137. When row 1 is selected (row address 00000), the row conductors from terminals $C_1$ and $D_1$ are turned on in proper clock sequence. The gate of transistor 137 is coupled to the row conductor from terminal $C_1$ of the read select drive circuit (FIG. 20) which controls the read portion of the memory cell and the gate of transistor 135 is coupled to the conductor line from terminal $D_1$ of the write select drive (FIG. 21) which controls the write portion of the memory cell. The cells in the first column are precharged along the column conductor lines from terminals $K_1$ and $L_1$. Thus, the write portion of the first cell (transistor 135) is precharged along the $K_1$ line and the read portion of the cell (transistor 137) is precharged along the $L_1$ line. Column selection from the Y decode circuit (FIG. 23) is achieved through the read-write control circuit and refresh amplifiers (FIG. 24). When column 1 is selected (Y address 00000), an input signal is written into the first cell in the uppermost corner of the memory array along the column conductor line from terminal $F_1$ and information is read out of such first cell along the column conductor line from terminal $G_1$. The actual storage of information is done in field effect transistor 136. Thus, when information is to be written into the first cell, line $D_1$ is on, turning on transistor 135 and the information transmitted along line $F_1$ is transmitted to the gate of transistor 136, where such information is stored. When information is to be read out of the first cell, line $C_1$ is on, turning on transistor 137 so that the information stored in transistor 136 is gated out along column line $G_1$.

For operation of the memory subsystem 10, a four phase clock must be supplied. Provision has been made for the clock phases $\phi_1$, $\phi_2$, $\phi_3$ and $\phi_4$ to be supplied externally. The subsystems in the illustrated embodiment, however, each contain clock generator circuits illustrated in FIGS. **28*a*–28*c* which optionally allow two of the four phases ($\phi_1$ and $\phi_3$) to be applied to the system externally and the other two phases ($\phi_2$ and $\phi_4$) to be generated internally from phases $\phi_1$ and $\phi_3$. In general, the clock generators are field effect transistor phase shifting circuits. The first of such circuits, illustrated in FIG. 28*a*, generates phase $\phi_2$ at its output terminal when phases $\phi_1$ and $\phi_3$ are applied to its input terminal. Voltage $V_{GG}$ (approximately 21 volts) is utilized as the supply voltage for the clock generators. The second clock generator circuit illustrated in FIG. 28*b*, generates phase $\phi_{4L}$ at its output terminal in response to pulses from phases $\phi_1$ and $\phi_3$ which are applied to its input terminal; the third clock generator circuit, illustrated in FIG. 28*c***, generates phase $\phi_{4H}$ at its output terminal in response to pulses from phases $\phi_1$ and $\phi_3$ which are applied to its input terminal. The phase shifting of the clock generators is adjusted by the relative resistor and capacitor values in the circuit.

The clock generators illustrated are one embodiment of providing the four phase clocking system utilized in the memory and are shown here mainly for the purpose of illustrating the extent of the complexity of a single memory subsystem 10 of the illustrated embodiment which is comprised of about 1,230 individual circuits. Clock conductors are also provided by common bussing system 157 as previously described so that the four phase clocking system may be provided externally.

A timing diagram of the completed random access memory system of FIG. 8 is illustrated in FIG. 29. Shown in FIG. 29 are the pulses ($V_{DD}$ in amplitude) of the four clock phases $\phi_1$–$\phi_4$. Also shown in the figure are the address bit pulses $X_0$–$X_4$ and $Y_0$–$Y_4$ having and amplitude of $V_{DD}$ and lasting in duration during clock phases $\phi_1$ and $\phi_2$. The read/write control signal (R/W) is of amplitude value $V_{DD}$ for writing into a cell and of amplitude value $V_{SS}$ for reading out of a cell. The R/W signal lasts in duration through clock phases $\phi_3$–$\phi_4$. The chip select signal (C/S) is of amplitude value $V_{DD}$ ($V_{SS}$ to disable) and lasts in duration through clock phases $\phi_3$ and $\phi_4$. Input data of amplitude $V_{DD}$ (equal to a binary 0) and $V_{SS}$ (equal to a binary 1) is introduced into the system during the duration of clock phase $\phi_4$ while data is transmitted out of the system during clock phase $\phi_3$.

Referring to FIG. 30, a metallized ceramic (or other insulating material) substrate 200 comprising a package for the memory system of FIG. 8 is illustrated. The monolithic integrated semiconductor memory system of FIG. 8 is mounted on substrate 200 and the various pins or conductors P of package substrate 200 provide means for applying the various signals to the system. An example of the signals applied to the various pins to provide such signals for the system are given in TABLE IV below.

TABLE IV

| Pin | Function | | Pin | Function | |
|---|---|---|---|---|---|
| $P_1$ | $V_{BB}$ (SUB) | | $P_{21}$ | $V_{DD}$ | 307 |
| $P_2$ | $I/O_1$ | ↑ | $P_{22}$ | F/B (enable) | 312 Cols. 3 and 4 |
| $P_3$ | $I/O_2$ | 174 Col. 1 | $P_{23}$ | $I/O_9$ | ↑ |
| $P_4$ | $I/O_3$ | ↓ | $P_{24}$ | $I/O_{10}$ | 174 Col. 3 |
| $P_5$ | $I/O_4$ | | $P_{25}$ | $I/O_{11}$ | ↓ |
| $P_6$ | $V_{SS}$ (GND) | | $P_{26}$ | $I/O_{12}$ | |
| $P_7$ | $\Phi_1$ | ↑ | $P_{27}$ | $\Phi_3$ | ↑ |
| $P_8$ | $Y_4$ | | $P_{28}$ | $V_{GG}$ | |
| $P_9$ | $Y_3$ | | $P_{29}$ | $X_0$ | |
| $P_{10}$ | $Y_2$ | | $P_{30}$ | $X_1$ | 157 |
| $P_{11}$ | $Y_1$ | 157 | $P_{31}$ | $X_2$ | |
| $P_{12}$ | $Y_0$ | | $P_{32}$ | $X_3$ | |
| $P_{13}$ | $X_4$ | | $P_{33}$ | R/W | |
| $P_{14}$ | C/S | | $P_{34}$ | $\Phi_4$ | ↓ |
| $P_{15}$ | $\Phi_2$ | ↓ | $P_{35}$ | $V_{SS}$ (GND) | |
| $P_{16}$ | $I/O_5$ | ↑ | $P_{36}$ | $I/O_{13}$ | ↑ |
| $P_{17}$ | $I/O_6$ | 174 Col. 2 | $P_{37}$ | $I/O_{14}$ | 174 Col. 4 |
| $P_{18}$ | $I/O_7$ | ↓ | $P_{38}$ | $I/O_{15}$ | ↓ |
| $P_{19}$ | $I/O_8$ | | $P_{39}$ | $I/O_{16}$ | |
| $P_{20}$ | F/B (enable) | 312 Cols. 1 and 2 | $P_{40}$ | $V_{BB}$ (SUB) | |

CONCLUSION

It has been shown that complex electronic systems in accordance with the invention (such as the described memory system) having a plurality of superfluous subsystems include means for the self-interconnection and self-repair of the system. Subsystem enable circuits are interposed between one or more of the subsystems or a portion thereof and one or more common bussing systems. The subsystem selection circuits automatically select and enable or activate enough subsystems to complete the system and provide means for external deactivation of malfunctioning subsystems and the activation of replacement subsystems to repair the system. Although, in the memory system described, each subsystem is of the same type, it is contemplated that in other embodiments of the invention different types of subsystems are utilized to provide different types of systems. For example, where two different types of subsystems are utilized, one or more groups of interconnected selection circuits select enough subsystems of the one type and another group or groups of interconnected selection circuits select enough subsystems of the other type. The different type subsystems are interconnected by the common bussing system to which the selected subsystems are selectively coupled by the enable circuits. Although the memory system described is an insulated-gate field effect transistor embodiment, it is contemplated that other systems including other memory systems may be comprised of bipolar transistor devices, diode devices, etc. It should also be noted that although the coded signals in the first coded format are binary code, other coded formats such as excess 3, binary coded decimal, etc. could be utilized.

The descriptions of specific embodiments herein are merely illustrative of the principles underlying the inventive concepts. It is contemplated that various modifications of the disclosed embodiments as well as other embodiments of the invention will, without departing from the spirit and scope of the invention, be apparent to persons skilled in the art.

What is claimed is:

1. In a system including a plurality of subsystems and a respective plurality of automatic subsystem selection circuits operably associated therewith, the combination of at least one of said selection circuits comprising:

a. input decoder means for decoding input signals in a first coded format into a second coded format;

b. encoder means coupled to said input decoder means for altering the input signals coded in the second coded format and encoding such altered signals into the first coded format;

c. selective output means adapted to receive input signals in the first coded format and being operably connected to said encoder means for selectively transferring as output signals either input signals in the first coded format or altered signals in the first coded format to another one of said selection circuits; and d. logic means coupled to said selective output means and to a respective subsystem for selectively enabling or disabling said respective subsystem and for selectively causing said selective output means to transfer altered signals in the first coded format or input signals in the first coded format to said another one of said selection circuits.

2. In a system according to claim 1, wherein said logic means of said at least one selection circuit comprises:

a. a fuse;

b. fuse-blow logic means operably connected to said fuse for selectively open-circuiting said fuse in response to a command signal; and c. fuse logic gate means operably associated with said fuse and responsive to the state thereof for causing said selective output means to transfer input signals in the first coded format to said another one of said selection circuits and for disabling said respective subsystem when said fuse is in an open-circuit condition, and for causing said selective output means to transfer altered signals in the first coded format to said another one of said selection circuits and for providing for the selective enabling of said respective subsystem when said fuse is not in an open-circuit condition.

3. In a system according to claim 2, wherein the fuse logic gate means of said at least one selection circuit includes logic gate means responsive to input signals in the first coded format for selectively enabling or disabling said respective subsystem in accordance with such input signals in the first coded format when said fuse is not in an open-circuit condition.

4. In a system according to claim 1, wherein the input decoder means of said one least one selection circuit comprises a decoder section of a programmed logic array and the encoder means of said at least one selection circuit comprises an encoder section of a programmed logic array.

5. In a system according to claim 1, wherein the selective output means of said at least one selection circuit includes:

a. code input means for transmitting input signals in the first coded format into said at least one selection circuit;

b. code output means for transferring output signals to said another one of said selection circuits;

c. a first plurality of AND-gates responsive to ssid logic means selectively coupling said code input means to said input decoder means and selectively coupling said encoder means to said code output means; and d. a second plurality of AND-gates responsive to said logic means selectively coupling said code input means to said code output means; herein e. said first plurality of AND-gates transfer input signals in said first coded format to said input decoder means and transmit altered signals in said first coded format to said code output means when said logic means is in a first logic state and said second plurality of AND-gates transfer input signals in said first coded format to said code output means when said logic means is in a second logic state to provide said output signals for said another one of said selection circuits.

6. In a system according to claim 1, wherein each selection circuit is identical to said at least one selection circuit.

7. In a system according to claim 1, further including a plurality of input and/or output conductors, and wherein said at least one selection circuit includes input/output selection means responsive to said input decoder means for coupling at least one of said plurality of input and/or output conductors to said respective subsystem wherein one or more of said plurality of input and/or output conductors are selectively electrically coupled to said respective subsystem by said input/output selection means in accordance with input signals in the second coded format provided by said input decoder means.

8. In a system according to claim 7, wherein said input/output selection means includes:

a. input/output encoder means coupled to said input decoder means for encoding input signals in the second coded format into selective enabling signals; and b. a plurality of AND-gates responsive to said enabling signals for selectively electrically coupling one or more of said input and/or output conductors to said respective subsystem in accordance with said enabling signals.

9. In a system according to claim 8, wherein the input decoder means of said at least one selection circuit comprises a decoder section of a programmed logic array, the encoder means of said at least one selection circuit comprises a first encoder section of said programmed logic array and the input/output encoder means of said at least one selection circuit comprises a second encoder section of said programmed logic array.

10. In a system according to claim 1, wherein said selection circuits and said subsystems include insulated-gate field effect transistors.

11. In a system according to claim 1, wherein said first coded format of said at least one selection circuit is binary code.

12. In a system according to claim 11, wherein said second coded format of said at least one selection circuit is one-logical-one per binary coded number decoded by said input decoder means.

13. In a system according to claim 11, wherein the encoder means of said at least one selection circuit encodes an altered signal in the first coded format in which said altered signal in the first coded format is equal to the input signal in the first coded format increased by a binary one.

14. In a system including a plurality of subsystems and a respective plurality of automatic subsystem selection circuits operably associated therewith, the combination wherein each of said selection circuits comprises:

a. logic means for selectively enabling or disabling the respective subsystem;

b. logic selection means coupled to said logic means for determining whether a subsystem is to be enabled or disabled from the state of said logic means and in response to predetermined desired system criteria, and for transmitting information indicative of the enabled or disabled state of the respective subsystem to another of said selection circuits;

c. a plurality of input and/or output conductors for transmitting information into and/or out of the respective subsystem; and d. input/output selection means coupled to said logic means and to said logic selection means for selectively coupling the respective subsystem to one or more of said input and/or output conductors in accordance with the logic states of said logic means and said logic selection means.

15. In a system according to claim 14, wherein the logic means of each of said selection circuits comprises:

a. a fuse;
b. fuse-blow logic means operably connected to said fuse for selectively open-circuiting said fuse in response to a command signal; and
c. fuse logic gate means operably associated with said fuse and responsive to the state thereof for disabling the respective subsystem when said fuse is in an open-circuit condition, and for providing for the selective enabling of said respective subsystem when said fuse is not in an open-circuit condition, and for transmitting a signal to said logic selection means indicative of the state of said fuse.

16. In a system according to claim 15, wherein the fuse logic gate means of each of said selection circuits includes logic gate means responsive to said predetermined desired system criteria for selectively enabling or disabling said respective subsystem in accordance with such predetermined desired system criteria when said fuse is not in an open-circuit condition.

17. In a system including a plurality of subsystems and a respective plurality of automatic subsystem selection circuits operably associated therewith, the combination of a plurality of input and/or output conductors operably associated with a respective subsystem, and at least one of said selection circuits; said at least one selection circuit comprising:
a. input decoder means for decoding input signals in a first coded format into a second coded format;
b. encoder means coupled to said input decoder means for altering the input signals coded in the second coded format and encoding such altered signals into the first coded format;
c. selective output means adapted to receive input signals in the first coded format and being operably connected to said encoder means for selectively transferring as output signals either input signals in the first coded format or altered signals in the first coded format to another one of said selection circuits;
d. logic means coupled to said selective output means and to a respective subsystem for selectively enabling or disabling said respective subsystem and for selectively causing said selective output means to transfer altered signals in the first coded format or input signals in the first coded format to said another one of said selection circuits; and
e. input/output selection means coupled to said input decoder means for selectively coupling one or more of said plurality of input and/or output conductors to the respective subsystem in accordance with input signals in the second coded format provided by said input decoder means.

18. The system of claim 17 including a package for containing said system.

19. In a system according to claim 17, wherein the input/output selection means of said at least one selection circuit includes:
a. input/output encoder means coupled to said input decoder means for decoding input signals in the second coded format into selective enabling signals; and
b. a plurality of logic gates responsive to said enabling signals for selectively coupling one or more of said input and/or output conductors to the respective subsystem in accordance with said enabling signals.

20. In a system according to claim 17, wherein said logic means of said at least one selection circuit comprises:
a. a fuse;
b. fuse-blow logic means operably connected to said fuse for selectively open-circuiting said fuse in response to a command signal; and
c. fuse logic gate means operably associated with said fuse and responsive to the state thereof for causing said selective output means to transfer input signals in the first coded format to said another one of said selection circuits, and for disabling said respective subsystem when said fuse is in an open-circuit condition, and for causing said selective output means to transfer altered signals in the first coded format to said another one of said selection circuits and for providing for the selective enabling of said respective subsystem when said fuse is not in an open-circuit condition.

21. In a system according to claim 20 wherein the fuse logic gate means of said at least one selection circuit includes logic gate means responsive to input signals in the first coded format for selectively enabling or disabling said respective subsystem in accordance with such input signals in the first coded format when said fuse is not in an open-circuit condition.

22. In a system according to claim 20, wherein said fuse-blow logic means of said at least one selection circuit includes:
a. fuse select means responsive to signals transmitted through said input and/or output conductors for determining whether said fuse is to be blown; an
b. fuse-blow enable means for enabling the open-circuiting of said fuse when the fuse select means indicates that such fuse is to be blown.

23. In a system according to claim 17, wherein the selective output means of said at least one selection circuit includes:
a. code input means for transmitting input signals in the first coded format into said at least one selection circuit;
b. code output means for transferring output signals to said another one of said selection circuits;
c. a first plurality of AND-gates responsive to said logic means selectively coupling said code input means to said input decoder means and selectively coupling said encoder means to said code output means; and
d. a second plurality of AND-gates responsive to said logic means selectively coupling said code input means to said code output means; wherein
e. said first plurality of AND-gates transfer input signals in said first coded format to said input decoder means and transmit altered signals in said first coded format to said code output means when said logic means is in a first logic state and said second plurality of AND-gates transfer input signals in said first coded format to said code output means when said logic means is in a second logic state to provide said output signals for said another one of said selection circuits.

24. In a system according to claim 17, wherein each selection circuit is identical to said at least one selection circuit.

25. A complex electronic system comprising:
a. a plurality of integrated semiconductor subsystems positioned on a support substrate;

b. a plurality of conductor members selectively positioned on said substrate;

c. a respective plurality of enabling means, an enabling means being associated with each subsystem selectively positioned on said substrate for selectively electrically coupling said plurality of subsystems to said plurality of conductor members; and d. a respective plurality of automatic selection circuits, a selection circuit being associated with each subsystem for automatically selectively activating a predetermined number but less than all of said enabling means in response to predetermined desired system criteria, whereby said predetermined number of said subsystems are selectively electrically coupled to said plurality of conductor members to provide said system.

26. A complex electronic system according to claim 25 wherein said subsystems are comprised of pluralities of different circuits for performing pluralities of signal functions.

27. A complex electronic system according to claim 25 wherein said subsystems, said conductor members, said enabling means and said selection circuits are respectively positioned on said substrate such that each of said subsystems has access to said plurality of conductor members.

28. A complex electronic system according to claim 27 wherein said substrate comprises a semiconductor slice and said system is a monolithic integrated semiconductor system.

29. A complex electronic system according to claim 25 wherein said enabling means are each comprised of a plurality of electronic switches coupled together for selectively electrically coupling a plurality of said conductor members to said subsystems simultaneously in response to enable signals provided by said predetermined number of said automatic selection circuits to provide said system.

30. The complex electronic system of claim 25 including a package for containing said system.

31. A complex electronic system according to claim 25 including means for operating said selection circuits to deactivate a malfunctioning subsystem and activate a spare subsystem to repair said system.

32. A complex electronic system according to claim 25 wherein each of said automatic selection circuits comprises:

a. input decoder means for decoding input signals in a first coded format into a second coded format;

b. encoder means coupled to said input decoder means for altering the input signals coded in the second coded format and encoding such altered signals into the first coded format;

c. selective output means adapted to receive input signals in the first coded format and being operably connected to said encoder means for selectively transferring as output signals either input signals in the first coded format or altered signals in the first coded format to another one of said selection circuits; and d. logic means coupled to said selective output means and to a respective enabling means for selectively activating or deactivating said respective enabling means and selectively enabling or disabling a respective subsystem and for selectively causing said selective output means to transfer altered signals in the first coded format or input signals in the first coded format as output signals to said another one of said selection circuits.

33. A complex electronic system according to claim 32 wherein the logic means of each of said selection circuits comprises:

a. a fuse;

b. fuse-blow logic means operably connected to said fuse for selectively open-circuiting said fuse in response to a command signal; and c. fuse logic gate means operably associated with said fuse and responsive to the state thereof for causing said selective output means to transfer input signals in the first coded format to said another one of said selection circuits and for deactivating said respective enabling means and disabling said respective subsystem when said fuse is in an open-circuit condition, and causing said selective output means to transfer altered signals in the first coded format to said another one of said selection circuits and for providing for the selective activation of the respective enabling means and the selective enabling of the respective subsystem when said fuse is not in an open-circuit condition.

34. A complex electronic system according to claim 33 wherein the fuse logic gate means of each of said selection circuits includes logic gate means responsive to input signals in the first coded format for selectively activating the respective enabling means and enabling the respective subsystem, or deactivating the respective enabling means and disabling the respective subsystem in accordance with such input signals in the first coded format when said fuse is not in an open-circuit condition.

35. A complex electronic system according to claim 25 wherein each of said automatic selection circuits comprises:

a. logic means for selectively activating a respective enabling means and a respective subsystem, or deactivating the respective enabling means and the respective subsystem;

b. logic selection means coupled to said logic means for determining whether a subsystem and its respective enabling means is to be activated or deactivated from the state of said logic means and in response to predetermined desired system criteria, and for transmitting information indicative of the activated or deactivated state of the respective subsystem and its respective enabling means to another one of said selection circuits; and c. input/output selection means coupled to said logic means and to said logic selection means for selectively coupling the respective subsystem to one or more of said conductor members in accordance with the logic states of said logic means and said logic selection means.

36. A complex electronic system according to claim 25 wherein each of said automatic selection circuits comprises a. input decoder means for decoding input signals in a first coded format into a second coded format;

b. encoder means coupled to said input decoder means for altering the input signals encoded in the second coded format and encoding such altered signals into the first coded format;

c. selective output means adapted to receive input signals in the first coded format and being operably associated with said encoder means for selectively transferring as output signals either input signals in the first coded format or altered signals in the first coded format to another one of said selection circuits;

d. logic means coupled to said selective output means and to a respective subsystem and a respective enabling means for selectively activating or deactivating said respective subsystem and respective enabling means and for selectively causing said selective output means to transfer altered signals in the first coded format or input signals in the first coded format to said another one of said selection circuits; and e. input/output selection means coupled to said input decoder means for selectively coupling one or more of said plurality of conductor members to the respective subsystem in accordance with input signals in the second coded format provided by said input decoder means.

37. A complex electronic system according to claim 36 wherein the input/output selection means of each of the selection circuits includes:

a. input/output encoder means coupled to said input decoder means for decoding input signals in the second coded format into selective input and/or output conductor enabling signals; and b. a plurality of logic gates responsive to said enabling signals for selectively coupling one or more of said conductor members to the respective subsystem in accordance with said input and/or output conductor enabling signals.

* * * * *